(12) United States Patent
Chonan et al.

(10) Patent No.: US 8,808,956 B2
(45) Date of Patent: *Aug. 19, 2014

(54) POLYESTER RESIN FOR TONER, TONER, DEVELOPER, TONER CARTRIDGE, PROCESS CARTRIDGE, AND IMAGE FORMING APPARATUS

(71) Applicant: Fuji Xerox Co., Ltd., Tokyo (JP)

(72) Inventors: Shiori Chonan, Kanagawa (JP); Sumiaki Yamasaki, Kanagawa (JP); Satoshi Hiraoka, Kanagawa (JP); Yuki Sasaki, Kanagawa (JP); Susumu Yoshino, Kanagawa (JP); Hirotaka Matsuoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/626,581

(22) Filed: Sep. 25, 2012

(65) Prior Publication Data

US 2013/0022906 A1 Jan. 24, 2013

Related U.S. Application Data

(63) Continuation-in-part of application No. 13/296,464, filed on Nov. 15, 2011.

(30) Foreign Application Priority Data

Apr. 15, 2011 (JP) ................................. 2011-091570
Apr. 13, 2012 (JP) ................................. 2012-092445

(51) Int. Cl.
*G03G 9/087* (2006.01)

(52) U.S. Cl.
CPC ........ *G03G 9/08755* (2013.01); *G03G 9/08791* (2013.01); *G03G 9/08795* (2013.01)

USPC .................... 430/109.4; 430/123.5; 528/176; 399/252

(58) Field of Classification Search
CPC .......... G03G 9/08755; G03G 9/08791; G03G 9/08795
USPC .............. 430/109.4, 123.5; 528/176; 399/252
See application file for complete search history.

(56) References Cited

U.S. PATENT DOCUMENTS

| | | | |
|---|---|---|---|
| 2003/0203301 A1 | 10/2003 | Iga | |
| 2004/0152813 A1 | 8/2004 | Shirai | |
| 2007/0015077 A1* | 1/2007 | Yamashita et al. | 430/109.4 |
| 2012/0264041 A1* | 10/2012 | Yamasaki et al. | 430/105 |
| 2013/0022906 A1 | 1/2013 | Chonan et al. | |
| 2013/0188986 A1 | 7/2013 | Yamasaki et al. | |

FOREIGN PATENT DOCUMENTS

| | | |
|---|---|---|
| EP | 2 511 319 A1 | 10/2012 |
| JP | A-59-22919 | 2/1984 |
| JP | A-2004-226569 | 8/2004 |
| JP | A-2006-292820 | 10/2006 |
| JP | A-2007-137910 | 6/2007 |
| JP | A-2007-240831 | 9/2007 |
| JP | A-2007-292818 | 11/2007 |
| JP | A-2007-322926 | 12/2007 |
| JP | B2-4505738 | 7/2010 |
| JP | B1-4699558 | 6/2011 |
| JP | A-2011-246647 | 12/2011 |
| JP | A-2012-229413 | 11/2012 |
| JP | A-2012-229420 | 11/2012 |
| JP | A-2012-230374 | 11/2012 |
| JP | A-2012-230375 | 11/2012 |
| JP | A-2012-230376 | 11/2012 |
| JP | A-2012-230377 | 11/2012 |

OTHER PUBLICATIONS

Jul. 2, 2012 Extended European Search Report issued in European Application No. 11 19 0248.2.
U.S. Appl. No. 13/296,494 in the name of Yamasaki et al, filed Nov. 15, 2011.
Japanese Office Action issued in Application No. 2012-092445 dated Jan. 15, 2013.
U.S. Appl. No. 13/610,117 in the name of Yamasaki et al., filed Sep. 11, 2012.
Nov. 13, 2013 Office Action issued in U.S. Appl. No. 13/610,117.

* cited by examiner

Primary Examiner — Peter Vajda
(74) Attorney, Agent, or Firm — Oliff PLC

(57) ABSTRACT

A polyester resin for a toner including: a repeating unit derived from a dicarboxylic acid component; and a repeating unit derived from a diol component represented by Formula 1:

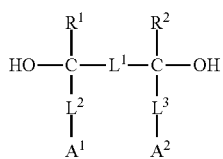

Formula 1 wherein each of $R^1$ and $R^2$ independently represents a hydrogen atom or a methyl group, each of $L^1$, $L^2$ and $L^3$ independently represents a divalent linking group selected from the group consisting of carbonyl groups, ester groups, ether groups, sulfonyl groups, substituted or unsubstituted chained alkylene groups, substituted or unsubstituted cyclic alkylene groups, substituted or unsubstituted arylene groups, and combinations thereof, $L^1$ and $L^2$ or $L^1$ and $L^3$ optionally forms a ring, and each of $A^1$ and $A^2$ independently represents a rosin ester group, wherein the solubility parameter (SP) value is from 9.1 to 9.7.

7 Claims, 3 Drawing Sheets

POLYESTER RESIN FOR TONER, TONER, DEVELOPER, TONER CARTRIDGE, PROCESS CARTRIDGE, AND IMAGE FORMING APPARATUS

CROSS-REFERENCE TO RELATED APPLICATION(S)

This is a Continuation-In-Part application of U.S. application Ser. No. 13/296,494 filed in the United States on Nov. 15, 2011.

This application claims priority under 35 U.S.C. §119 from Japanese Patent Application No. 2012-092445 filed on Apr. 13, 2012.

BACKGROUND

1. Field

The present invention relates to a polyester resin for a toner, a toner, a developer, a toner cartridge, a process cartridge, and an image forming apparatus.

2. Description of the Related Art

Similar to electrophotography, a method for visualizing image information by forming and developing an electrostatic latent image has been currently used in various fields. According to the method, an image is formed by electrically charging the entire surface of a photoconductor (or a latent image holding member), exposing the surface of the photoconductor to laser light according to image information to form an electrostatic latent image, developing the electrostatic latent image with a developer including a toner to form a toner image, and then transferring and fixing the toner image to the surface of a recording medium.

A resin composition suitable for the preparation of an electrophotographic toner for a heat roll fixing system is disclosed, for example, in Japanese Patent No. 4505738. The resin composition contains a reaction product (P) of a rosin (R) and an epoxy group-containing compound (E), and a binder resin (Q). An electrophotographic toner including the resin composition is substantially prevented from hot offset and has excellent low-temperature fixability.

A polyester for a toner prepared by polycondensation of an alcoholic component with a carboxylic acid component containing a purified rosin is disclosed, for example, in JP-A-2007-137910. A toner including the polyester has excellent low-temperature fixability and storability and produces less malodor.

An object of the present invention is to provide a polyester resin for use in the preparation of a toner with excellent electrostatic properties.

SUMMARY (1) A polyester resin for a toner including: a repeating unit derived from a dicarboxylic acid component; and a repeating unit derived from a diol component represented by Formula 1:

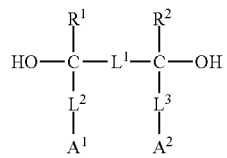

Formula 1 wherein each of $R^1$ and $R^2$ independently represents a hydrogen atom or a methyl group, each of $L^1$, $L^7$ and $L^3$ independently represents a divalent linking group selected from the group consisting of carbonyl groups, ester groups, ether groups, sulfonyl groups, substituted or unsubstituted chained alkylene groups, substituted or unsubstituted cyclic alkylene groups, substituted or unsubstituted arylene groups, and combinations thereof, $L^1$ and $L^2$ or $L^1$ and $L^3$ optionally forms a ring, and each of $A^1$ and $A^2$ independently represents a rosin ester group, wherein the solubility parameter (SP) value is from 9.1 to 9.7.

BRIEF DESCRIPTION OF DRAWINGS

Exemplary embodiments of the present invention will be described in detail based on the following figures, wherein.

DETAILED DESCRIPTION OF EXEMPLARY EMBODIMENTS

Figure 1:
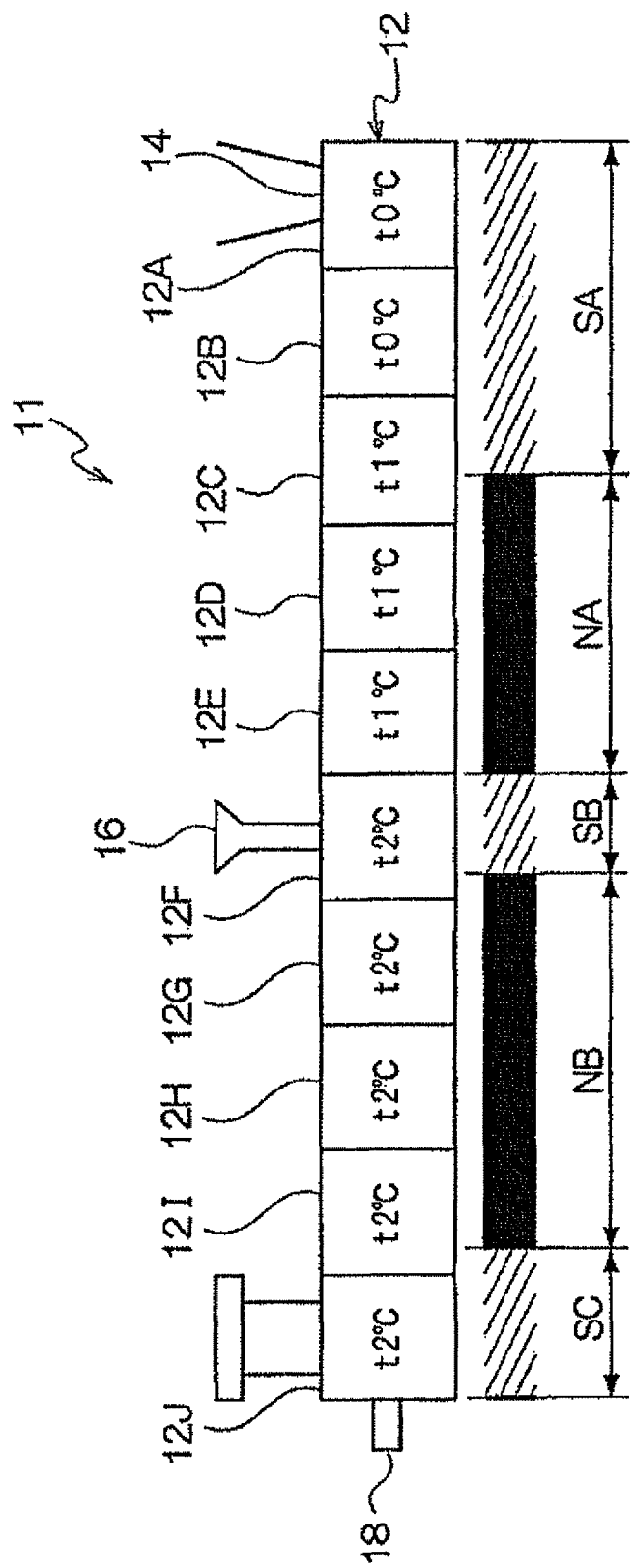
FIG. 1 is a diagram for explaining the state of a screw in an example of a screw extruder for use in the preparation of a toner according to the present exemplary embodiment

Exemplary embodiments of the polyester resin for a toner, the toner, the developer, the toner cartridge, the process cartridge and the image forming apparatus of the invention will now be described in detail.

<Polyester Resin for Toner>

The polyester resin (hereinafter, also referred to as 'specific polyester resin') for a toner according to the present exemplary embodiment contains a repeating unit derived from a dicarboxylic acid component and a repeating unit derived from a diol component represented by Formula 1, and the solubility parameter (SP) value is from 9.1 to 9.7.

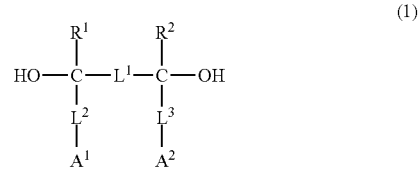

(1)

wherein each of $R^1$ and $R^2$ independently represents a hydrogen atom or a methyl group. Each of $L^1$, $L^2$ and $L^3$ independently represents a divalent linking group selected from the group consisting of carbonyl groups, ester groups, ether groups, sulfonyl groups, chained alkylene groups which may be substituted or unsubstituted, cyclic alkylene groups which may be substituted or unsubstituted, arylene groups which may be substituted or unsubstituted, and combinations thereof, and $L^1$ and $L^2$ or $L^1$ and $L^3$ may form a ring. Each of $A^1$ and $A^2$ independently represents a rosin ester group.

In the present exemplary embodiment, the solubility parameter (hereinafter referred to as the SP value) is calculated from Fedor's method.

Specifically, the SP value is calculated from the following equation, which is described in detail in, for example, Polym. Eng. Sci., vol. 14, p, 147 (1974).

Equation:

$$SP\ value = \sqrt{(Ev/v)} = \sqrt{(\Sigma \Delta ei/\Sigma \Delta vi)}$$

(wherein, Ev refers to a vaporization energy, v refers to a molar volume (cm$^3$/mol), $\Delta ei$ refers to a vaporization energy of each of atoms or an atomic group, and $\Delta vi$ refers to a molar volume of each of atoms or an atomic group.)

The details of the calculation method are described in books such as "Polymer with Practical Applications for Engineers (p. 66)" authored by Junji Mukai et al., (Kodansha Scientific, 1981) and Polymer Handbook (4$^{th}$ edition, A Willey-interscience Publication), and the same method is applied to the present exemplary embodiment.

While (cal/cm$^3$)$^{1/2}$ is used as a unit of SP values, the unit will be omitted in accordance with custom, and the SP values will be indicated in a dimensionless unit in the present exemplary embodiment.

The toner including the specific polyester resin according to the present exemplary embodiment has excellent fixabiliy, as the SP value of specific polyester resin is from 9.1 to 9.7.

The toner including the specific polyester resin of the present exemplary embodiment is prevented from, for example, an offset in which a toner is transferred to members such as a fixing roller or a paper transfer roller, and image pollution caused by the offset is difficult to occur.

The reason why the toner containing the specific polyester resin of the present exemplary embodiment has excellent fixabiliy is inferred as follows.

A release agent (for example, various kinds of waxes) is added to the toner for the purpose of suppressing the offset and the like.

When a polyester having the same molecular structure as that of the specific polyester according to the present exemplary embodiment has an SP value of less than 9.1, and a toner includes the polyester and a release agent, it is assumed that an excessive compatibility between the polyester and the release agent occurs during the preparation or fixation of the toner. As a result, the release agent is not sufficiently exposed to the surface of the toner, reducing an effect of suppressing an offset by the release agent, and accordingly, an image pollution caused by the offset is likely to occur.

Meanwhile, when the polyester having the same molecular structure as that of the specific polyester of the present exemplary embodiment has an SP value of more than 9.7, a compatibility between the polyester and the release agent is not good enough, and it is difficult to disperse the release agent during the preparation of a toner. As a result, the content of the release agent in the toner is reduced, making it difficult to expect an effect of suppressing an offset by the release agent, and accordingly, image pollution caused by the offset is likely to occur.

In view of the above, it is inferred that the specific polyester of the present exemplary embodiment having the SP value of from 9.1 to 9.7 has an appropriate compatibility with the release agent, and as a result, the toner including the specific polyester of the present exemplary embodiment is unlikely to have such problems as above, and image pollution caused by the offset is unlikely to occur, thereby leading to excellent fixability.

The lower limit of the SP value of the specific polyester of the present exemplary embodiment is preferably 9.20 or more, more preferably 9.30 or more, and particularly preferably 9.35 or more, from the viewpoint of a better fixability of a toner.

The upper limit of the SP value of the specific polyester of the present exemplary embodiment is preferably 9.65 or less, more preferably 9.60 or less, even more preferably 9.50 or less, and particularly preferably 9.45 or less, from the viewpoint of a better fixability of a toner.

The SP value of the specific polyester of the present exemplary embodiment is adjusted, for example, depending on the kinds and contents of a repeating unit derived from an acid component and a repeating unit derived from an alcoholic component. For example, the SP value is determined by adjusting the ratio of contents of aromatic carboxylic acid and aliphatic carboxylic acid which can be used as an acid component, or the content of a repeating unit derived from a diol component (hereinafter, also referred to as "specific rosin diol") represented by Formula (1).

From the viewpoint of easily adjusting the SP value in the range of from 9.1 to 9.7, the specific polyester of the present exemplary embodiment has a content of a repeating unit derived from specific rosin diol contained in the entire resin in the range of preferably from 20% by mass to 70% by mass, and more preferably from 30% by mass to 60% by mass.

Further, the toner including the specific polyester of the present exemplary embodiment has excellent electrostatic properties. The reason for this is unclear but is inferred as follows.

The specific polyester of the present exemplary embodiment contains a rosin ester group derived from the specific rosin diol. The rosin ester group possesses a bulky structure and is highly hydrophobic, making it difficult for the specific polyester including the rosin ester groups according to the present exemplary embodiment to contain water. Furthermore, the specific polyester of the present exemplary embodiment has hydroxyl or carboxyl groups only at a terminal of the polyester resin in view of its structure, but when the number of the repeating unit is increased, the amount of the rosin ester groups in the resin is increased without the need to increase the amount of hydroxyl groups or carboxyl groups, which may adversely affect the electrostatic properties of the toner.

In addition, when the specific rosin diol is obtained by the reaction of a rosin with a difunctional epoxy compound, and the polyester is obtained by the polycondensation of the specific rosin diol and a carboxylic acid, it is difficult to contain moisture in the polyester since the rosin hardly remains unreacted in the polyester, compared to the case of a polyester obtained by the polycondensation of a carboxylic acid component containing a rosin. For this reason, it is inferred that the toner including the specific polyester of the present exemplary embodiment has excellent electrostatic properties.

Hereinafter, the specific polyester of the present exemplary embodiment, the constituent unit and the like will be described in detail.

In Formula (1), each of $R^1$ and $R^2$ independently represents a hydrogen atom or a methyl group. $R^1$ and $R^2$ may be the same as or different from each other, but preferably the same as each other.

In Formula (1), each of $L^1$, $L^2$ and $L^3$ independently represents a divalent linking group selected from the group consisting of carbonyl groups, ester groups, ether groups, sulfonyl groups, chained alkylene groups which may be substituted or unsubstituted, cyclic alkylene groups which may be substituted or unsubstituted, arylene groups which may be substituted or unsubstituted, and combinations thereof, and $L^1$ and $L^2$ or $L^1$ and $L^3$ may form a ring.

$L^2$ and $L^3$ may be the same as or different from each other, but preferably the same as each other.

The chained alkylene groups represented by $L^1$, $L^2$ and $L^3$ may be, for example, a $C_1$-$C_{10}$ alkylene group.

The cyclic alkylene groups represented by $L^1$, $L^2$ and $L^3$ may be, for example, a $C_3$-$C_7$ cyclic alkylene group.

The arylene groups represented by $L^1$, $L^2$ and $L^3$ may be, for example, a phenylene group, a naphthylene group and an anthracene group.

Examples of substituents of the chained alkylene group, the cyclic alkylene group and the arylene group include a $C_1$-$C_8$ alkyl group, an aryl group and the like. A linear, branched or cyclic alkyl group is preferred. Specific examples of such alkyl groups include a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, an 1-methylbutylgroup, an isohexyl group, a 2-ethylhexyl group, a 2-methylhexyl group, a cyclopentyl group, a cyclohexyl group, a phenyl group and the like.

In Formula (1), each of $A^1$ and $A^2$ independently represents a rosin ester group. That is, the specific rosin diol is a diol compound that contains two rosin ester groups in one molecule. In the present exemplary embodiment, the rosin ester group refers to a moiety in which a hydrogen atom is excluded from a carboxyl group included in a rosin.

The following is an example of a synthetic scheme of the specific polyester according to the present exemplary embodiment. As depicted in the synthetic scheme, a difunctional epoxy compound is reacted with a rosin to synthesize the specific rosin diol, which is then subjected to polycondensation with a dicarboxylic acid component to synthesize the specific polyester of the present exemplary embodiment. The portion surrounded by the dashed line in the structural formula representing the specific polyester corresponds to the rosin ester group of the present exemplary embodiment.

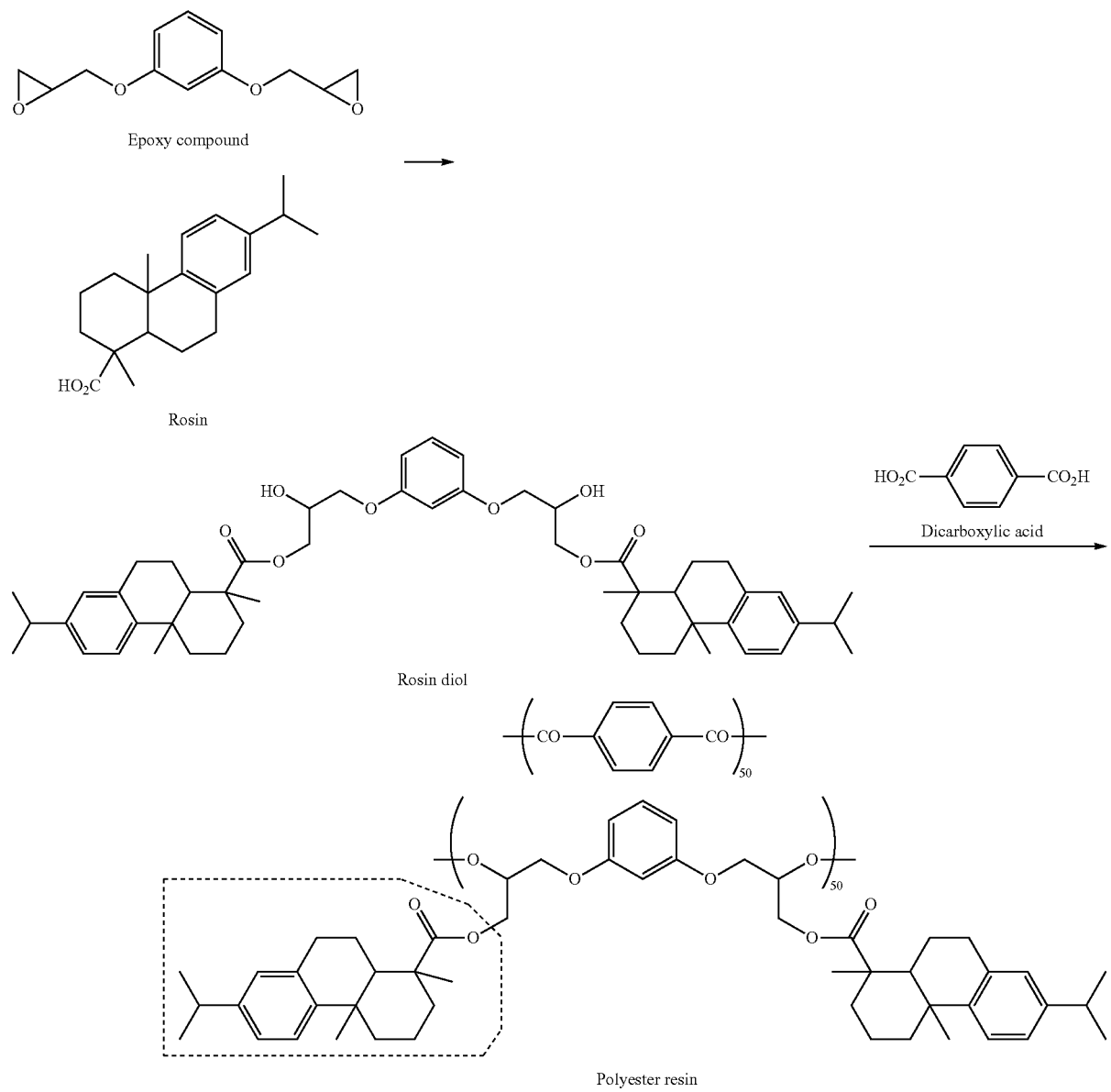

Hydrolysis of the specific polyester gives the following monomers. Since the polyester is a condensation product of a dicarboxylic acid and a diol in a ratio of 1:1, the constituent components of the resin can be estimated from the hydrosates.

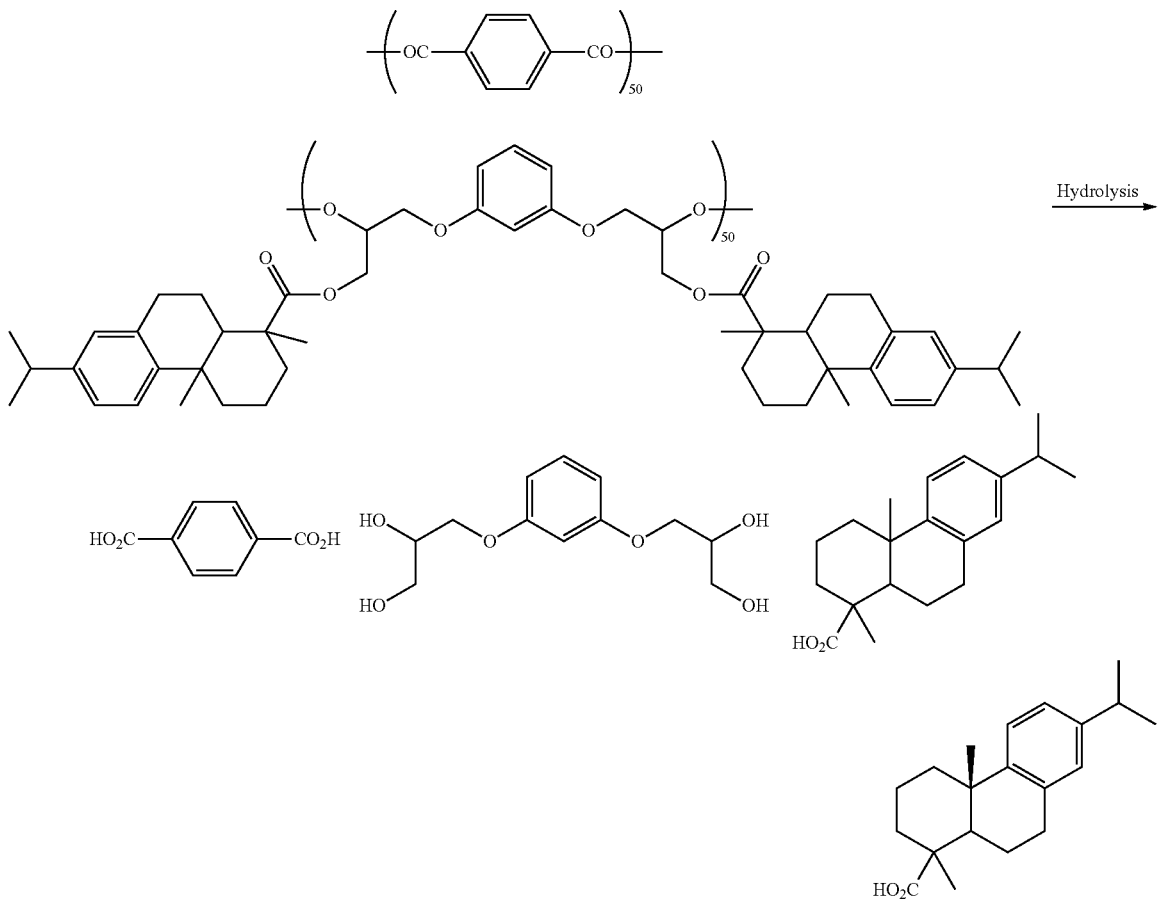

The specific rosin diol can be synthesized by methods known in the art, for example, by the reaction of a difunctional epoxy compound and a rosin. The specific rosin diol is preferably a reaction product of a difunctional epoxy compound and a rosin.

An epoxy group-containing compound that may be used in the present exemplary embodiment is a difunctional epoxy compound including two epoxy groups in one molecule. Examples of the epoxy group-containing compound include diglycidyl ethers of aromatic diols, diglycidyl ethers of aromatic dicarboxylic acids, diglycidyl ethers of aliphatic diols, diglycidyl ethers of alicyclic diols, alicyclic epoxides and the like.

Representative examples of the diglycidyl ethers of aromatic diols include diglycidyl ethers of bisphenol A, derivatives of bisphenol A, such as polyalkylene oxide adducts of bisphenol A, bisphenol F, derivatives of bisphenol F, such as polyalkylene oxide adducts of bisphenol F, bisphenol S, derivatives of bisphenol S, such as polyalkylene oxide adducts of bisphenol S, resorcinol, t-butylcatechol and biphenols as aromatic diol components.

Representative examples of the diglycidyl ethers of aromatic dicarboxylic acids include diglycidyl ethers of terephthalic acid, isophthalic acid and phthalic acid as aromatic dicarboxylic acid components.

Representative examples of the diglycidyl ethers of aliphatic diols include diglycidyl ethers of ethylene glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, and polytetramethylene glycol as aliphatic diol components.

Representative examples of the diglycidyl ethers of alicyclic diols include hydrogenated bisphenol A, derivatives of hydrogenated bisphenol A, such as polyalkylene oxide adducts of hydrogenated bisphenol A, and cyclohexanedimethanol as alicyclic diol components.

Representative examples of the alicyclic epoxides include limonene dioxide.

The epoxy group-containing compound may be obtained, for example, by the reaction of a diol component and an epihalohydrin. A higher molecular weight of the epoxy group-containing compound can be accomplished by polycondensation depending on the ratio of the diol component to the epihalohydrin.

In the present exemplary embodiment, the reaction between the rosin and the difunctional epoxy compound is mainly carried out by the ring-opening reaction of the epoxy groups of the difunctional epoxy compound with the carboxyl group of the rosin. The reaction is preferably carried out at a temperature equal to or higher than the melting temperatures of both the reactants and/or a temperature where both the reactants can be homogenized. Specifically, the reaction temperature is typically from 60° C. to 200° C. A catalyst may be added to promote the ring-opening reaction of the epoxy groups.

Examples of catalysts suitable for use in the reaction include: amines, such as ethylenediamine, trimethylamine and 2-methylimidazole; quaternary ammonium salts, such as triethylammonium bromide, triethylammonium chloride and butyltrimethylammonium chloride, and triphenylphosphine.

The reaction can be carried out by various methods. Generally, the reaction may be carried out in a batch manner. In this case, the rosin and the difunctional epoxy compound are added in a predetermined ratio to a heatable flask equipped with a condenser, a stirrer, an inert gas introducing hole and a thermometer, the mixture is heat-melted, and the reaction mixture is appropriately sampled to trace the reaction. The progress of the reaction can be mainly confirmed by a reduction in acidity. The reaction can be appropriately finished at or near the stoichiometric endpoint.

It is preferred to react the rosin and the difunctional epoxy compound in a molar ratio of from 1.5 to 2.5:1, preferably 1.8 to 2.2:1, and more preferably 1.85 to 2.1:1. If the rosin is less than 1.5 moles, the epoxy groups of the difunctional epoxy compound are left in the next step of the process for preparing polyester to cause a rapid increase in molecular weight, leading to a concern of gelation. In contrast, if the rosin is more than 2.5 moles, there may be a case that the rosin remains unreacted to cause deterioration in electrostatic properties due to an increase in acid value.

The rosin used in the present exemplary embodiment is a generic name for resin acids obtained from trees and is a naturally occurring substance that includes abietic acid, a kind of tricyclic diterpenes, and isomers thereof as major components. In addition to abietic acid, specific rosin components are palustric acid, neoabietic acid, pimaric acid, dehydroabietic acid, isopimaric acid, sandaracopimaric acid. The rosin used in the present exemplary embodiment is a mixture of these acids.

Rosins are largely divided into three kinds: tall rosins obtained from pulps as raw materials, gum rosins obtained from pine trees as raw materials, and wood rosins obtained from the roots of pine trees as raw materials, by collection methods of raw materials. The rosin used in the present exemplary embodiment is preferably a gum rosin and/or a tall rosin for their ease of purchase.

It is preferred to purify these rosins before use. A purified rosin can be obtained by removing high molecular weight substances thought to be derived from peroxides of resin acids and non-saponified substances included in unpurified rosins. Any purification methods known in the art can be used without particular limitation to purify rosins, and specific examples thereof include distillation recrystallization and extraction. Purification by distillation is preferred from an industrial viewpoint. A distillation method is usually selected taking into consideration the distillation time at a temperature of 200° C. to 300° C. and a pressure of 6.67 kPa or below. Recrystallization is performed, for example, by dissolving an unpurified rosin in a good solvent, removing the solvent by evaporation to obtain a concentrated solution, and adding a poor solvent to the solution. Examples of the good solvent include: aromatic hydrocarbons, such as benzene, toluene and xylene; chlorinated hydrocarbons, such as chloroform; alcohols, such as lower alcohols; ketones, such as acetone; and acetates, such as ethyl acetate. Examples of the poor solvent include hydrocarbon-based solvents, such as n-hexane, n-heptane, cyclohexane and isooctane. According to an extraction method, an unpurified rosin is dissolved in alkaline water to prepare an alkaline aqueous solution, the alkaline aqueous solution is extracted with an organic solvent to remove non-saponified insoluble substances, and the aqueous layer is neutralized to obtain a purified rosin.

The rosin used in the present exemplary embodiment may be a disproportionated rosin. The disproportionated rosin is obtained by heating a rosin including abietic acid as a major component in the presence of a disproportionation catalyst to eliminate unstable conjugated double bonds in the molecule. The disproportionated rosin is a mixture of dehydroabietic acid and dihydroabietic acid as major components.

The disproportionation catalyst may be any of those known in the art, for example: supported catalysts, such as palladium carbon, rhodium carbon and platinum carbon; metal powders, such as nickel and platinum powders; iodine; and iodides, such as iron iodide. The amount of the catalyst used to the rosin is generally from 0.01% by mass to 5% by mass, and preferably from 0.01% by mass to 1.0% by mass. The reaction temperature is from 100° C. to 300° C., and preferably from 150° C. to 290° C. Further, in a method for controlling the amount of dehydroabietic acid, dehydroabietic acid may be isolated, for example, by a method in which an ethanolamine salt is crystallized from a disproportionated rosin [J. Org. Chem., 31, 4246 (1996)], and then may be added such that the content is in the above range.

The rosin in the present exemplary embodiment may be a hydrogenated rosin. The hydrogenated rosin contains tetrahydroabietic acid and dihydroabietic acid as major components, and may be obtained by eliminating unstable conjugated double bonds in the molecule. The hydrogenation is performed by heating a crude rosin under a hydrogen pressure of generally from 10 $kg/cm^2$ to 200 $kg/cm^2$, and preferably 50 $kg/cm^2$ to 150 $kg/cm^2$ in the presence of a hydrogenation catalyst. The hydrogenation catalyst may be any of those known in the art, for example: supported catalysts, such as palladium carbon, rhodium carbon and platinum carbon; metal powders, such as nickel and platinum powders; iodine; and iodides, such as iron iodide. The amount of the catalyst used to the rosin is generally from 0.01% by mass to 5% by mass, and preferably 0.01% by mass to 1.0% by mass. The reaction temperature is from 0° C. to 300° C., and preferably 150° C. to 290° C.

The disproportionated rosin and the hydrogenated rosin may be purified in the same manner as described above before or after disproportionation and hydrogenation, respectively.

The rosin in the present exemplary embodiment may be a polymerized rosin obtained by polymerizing a rosin, an unsaturated carboxylic acid-modified rosin obtained by adding unsaturated carboxylic acid to a rosin, or a phenol-modified rosin. Further, the unsaturated carboxylic acid used for preparing an unsaturated carboxylic acid-modified rosin may be, for example, maleic acid, anhydrous maleic acid, fumaric acid, acrylic acid, metacrylic acid and the like. The unsaturated carboxylic acid-modified rosin is modified by using generally from 1 part by mass to 30 parts by mass of unsaturated carboxylic acid based on 100 parts of the raw rosin.

Among the rosins, the preferred rosin in the present exemplary embodiment is the purified rosin, the disproportionate rosin and the hydrogenated rosin, and may be used either alone or in combination thereof.

The exemplary compounds (1) to (42) of specific rosin diols suitable for use in the present exemplary embodiment are shown below, but the present exemplary embodiment is not limited thereto.

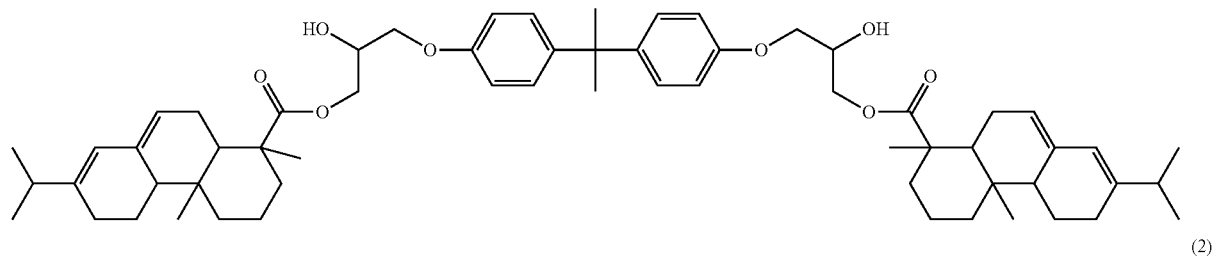
(1)
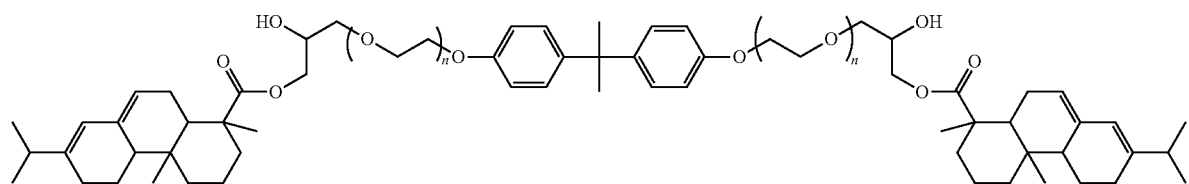
(2)
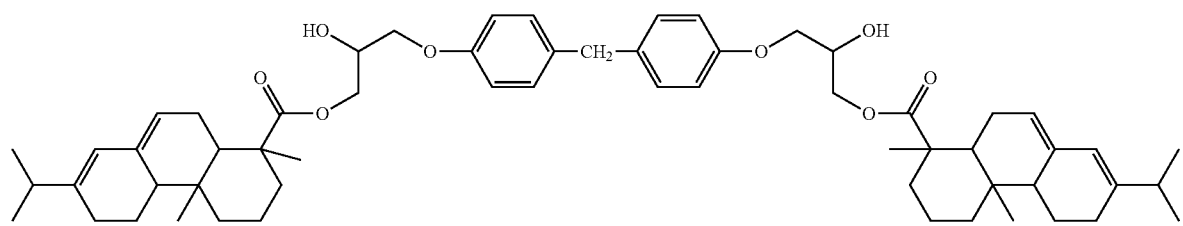
(3)
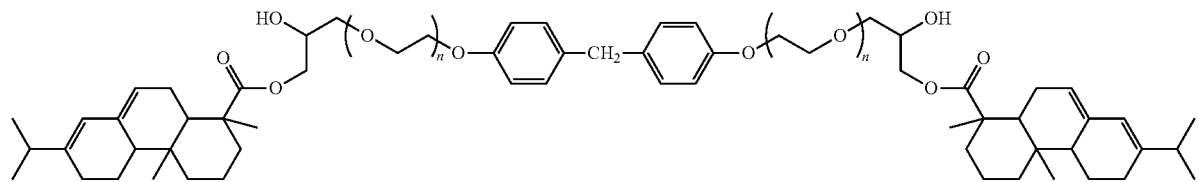
(4)
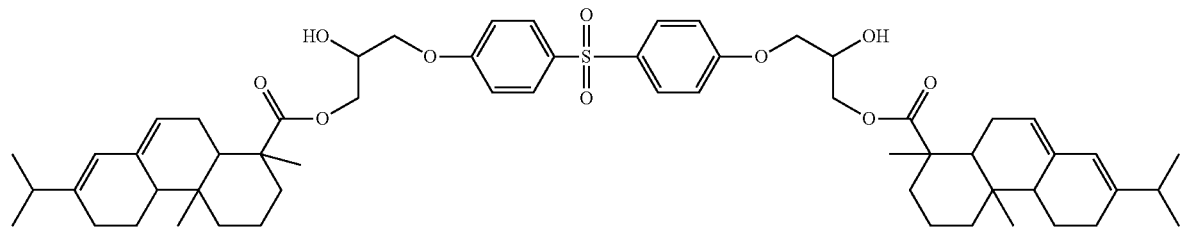
(5)
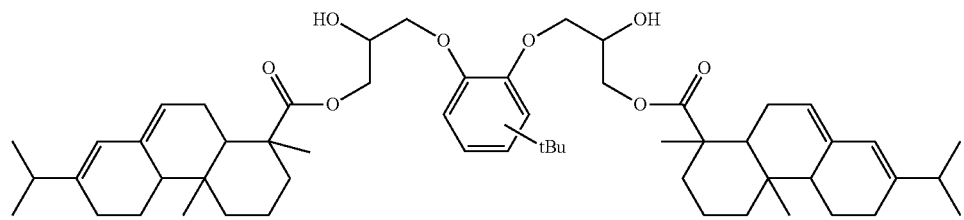
(6)

-continued
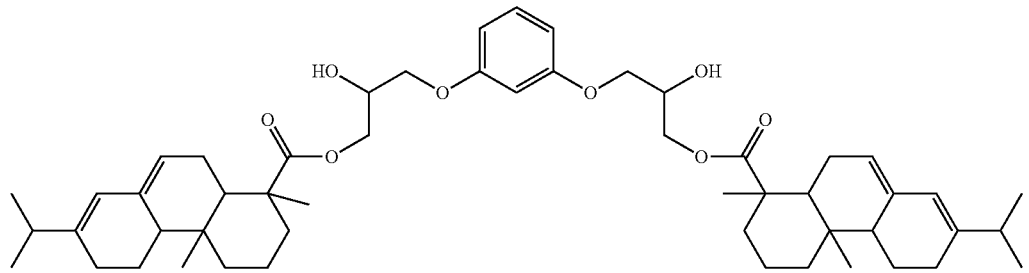
(7)
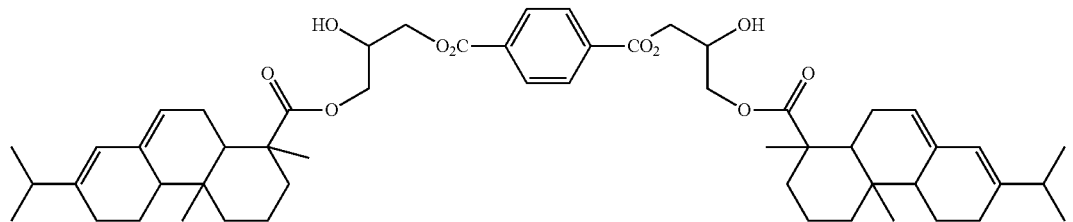
(8)
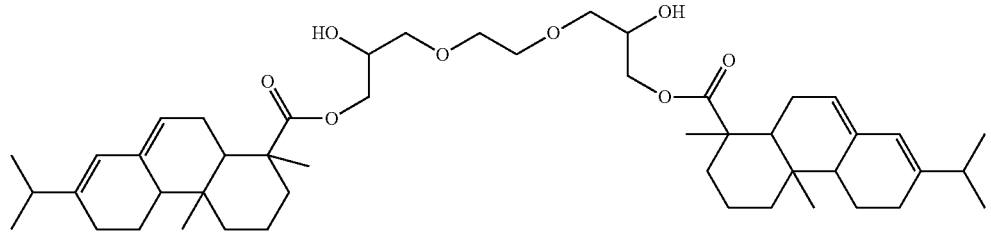
(9)
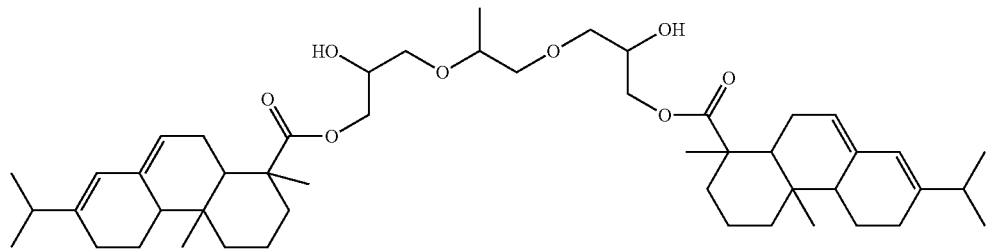
(10)
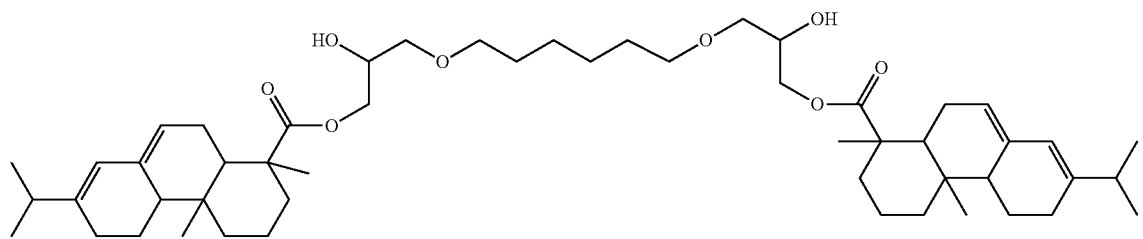
(12)
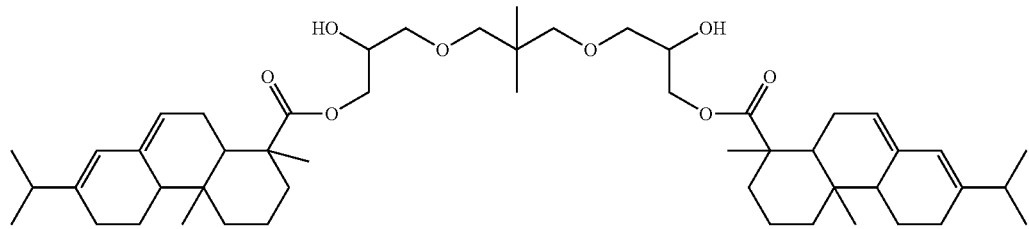
(13)

-continued
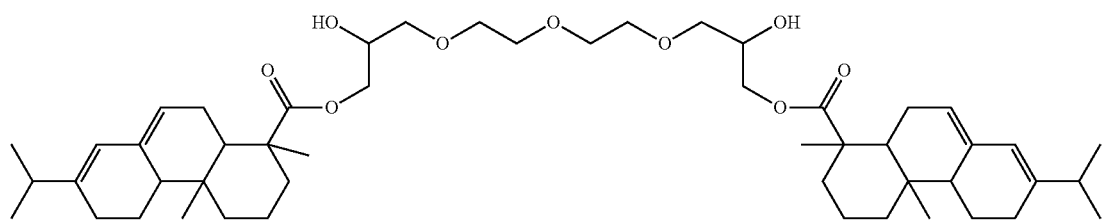
(14)
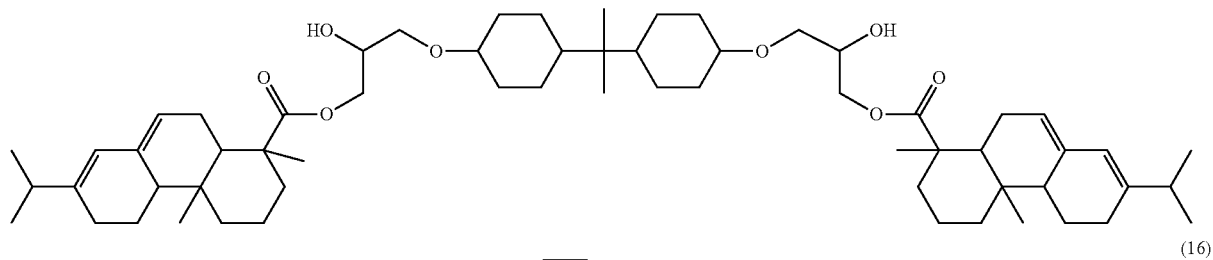
(15)
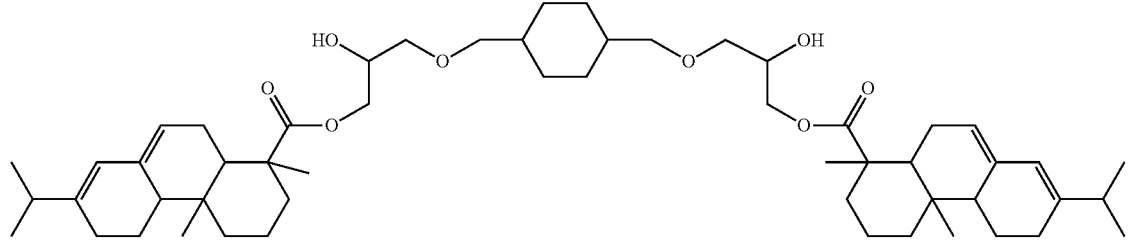
(16)
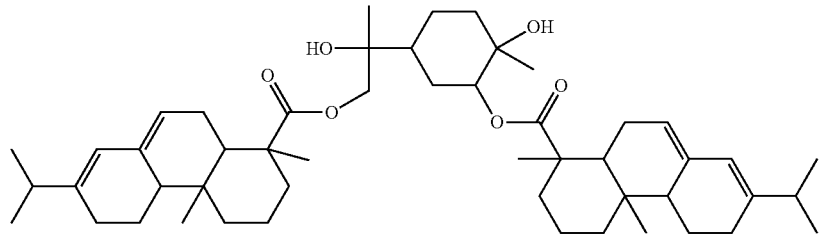
(17)
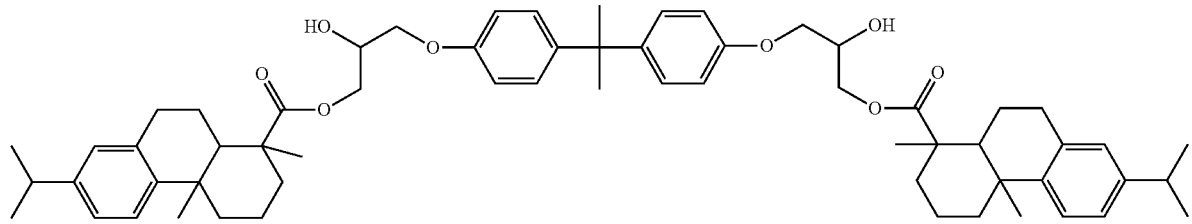
(18)
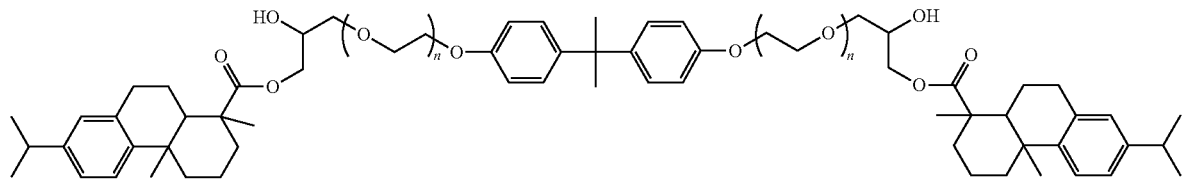
(19)

-continued
(20)
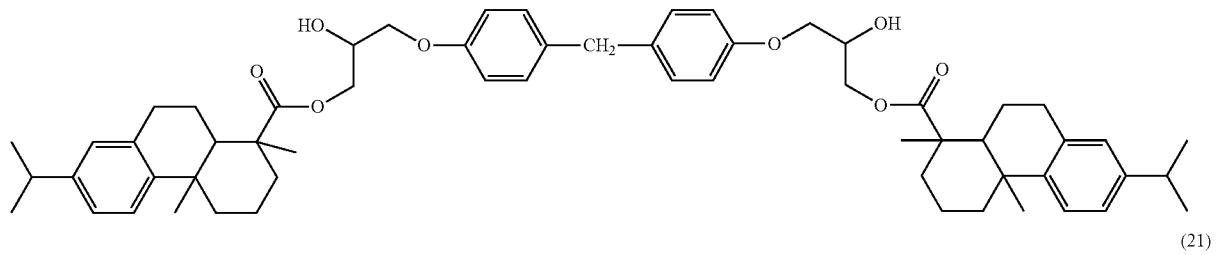
(21)
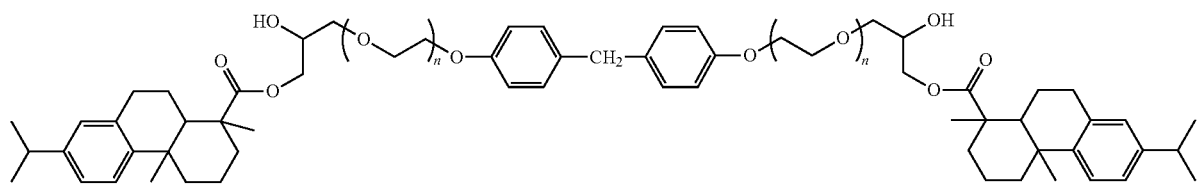
(22)
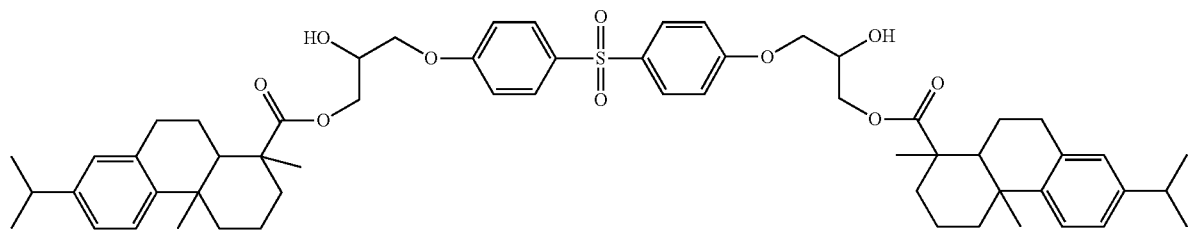
(23)
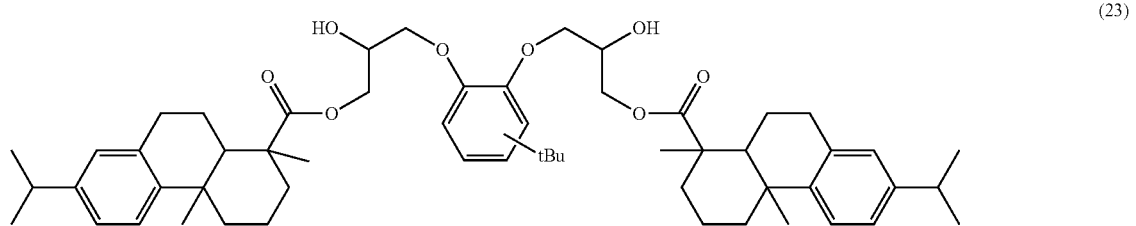
(24)
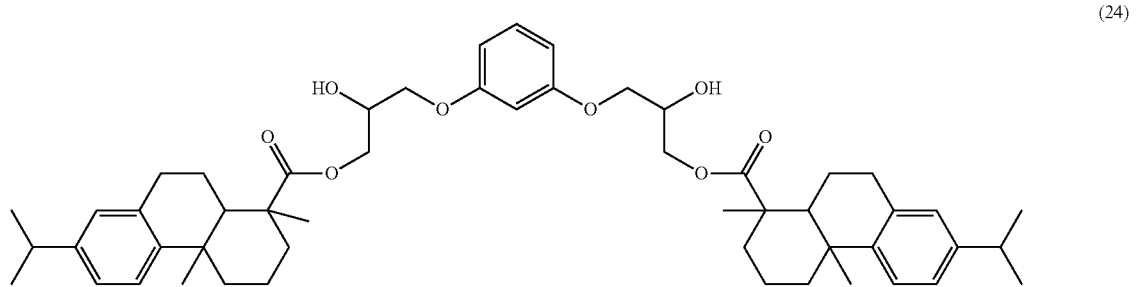
(25)
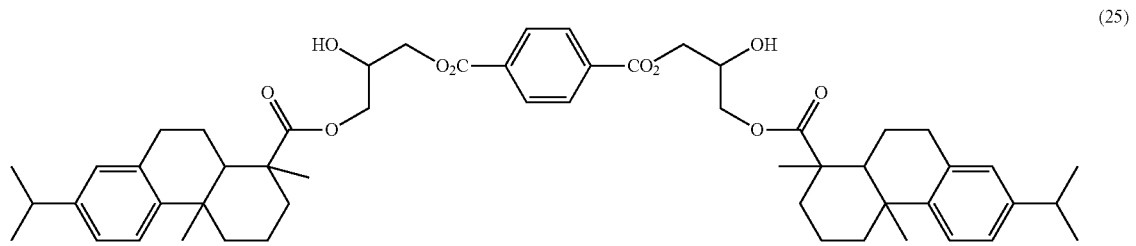

-continued
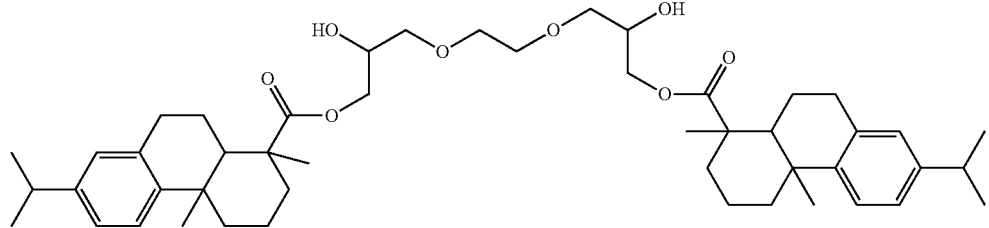
(26)
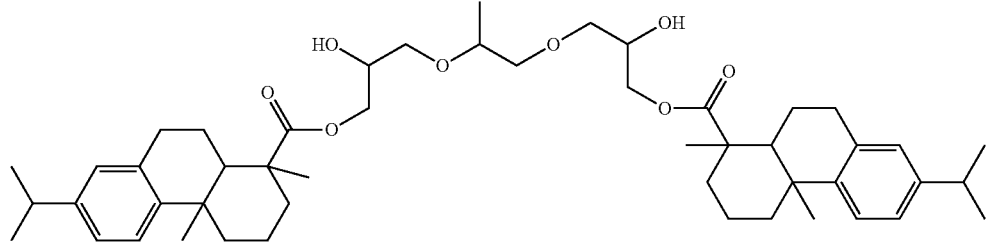
(27)
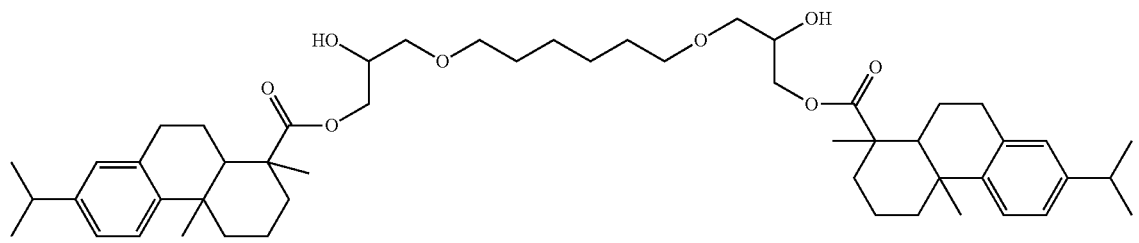
(28)
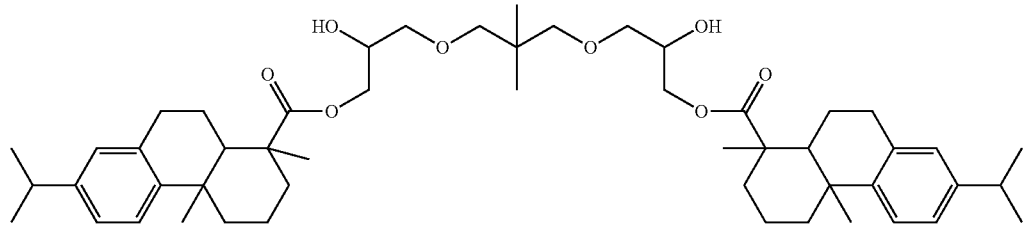
(29)
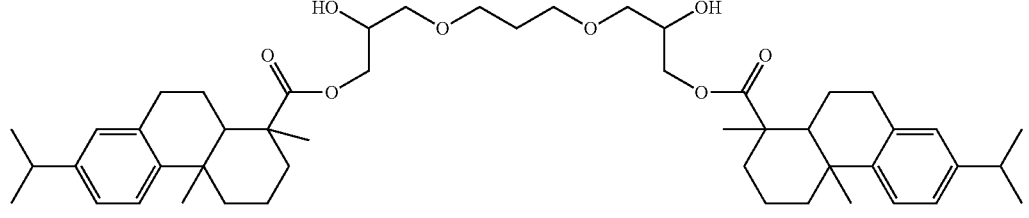
(30)
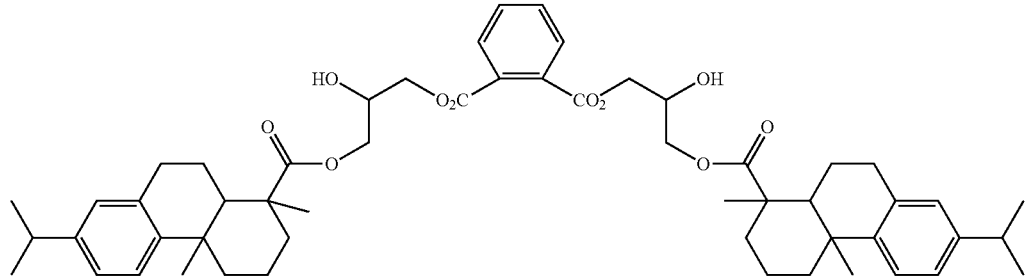
(31)

-continued
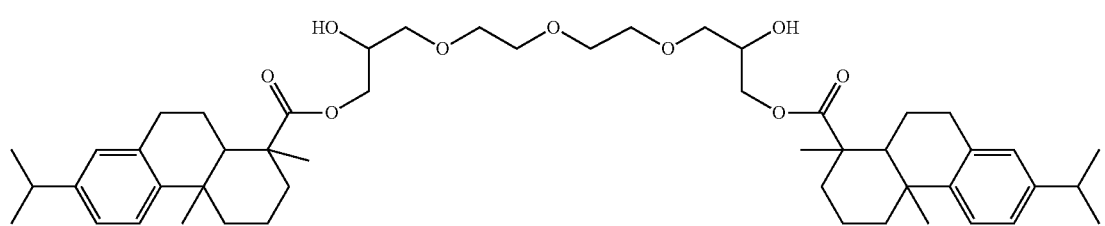
(32)
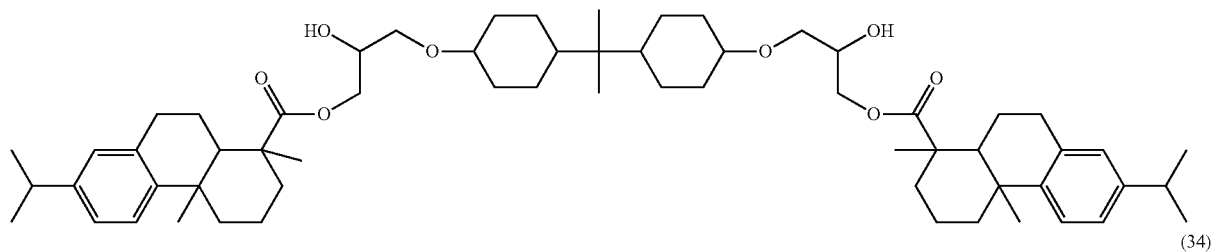
(33)
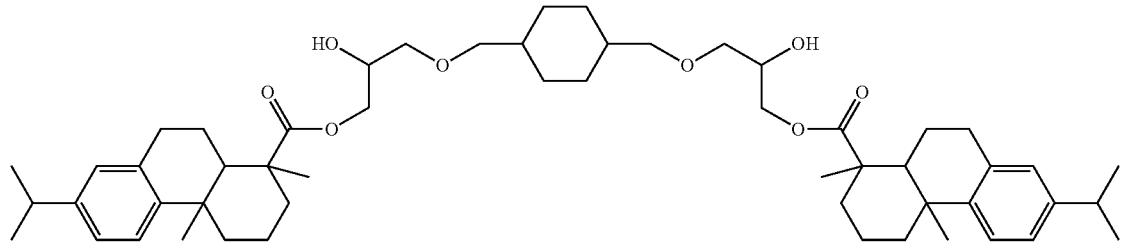
(34)
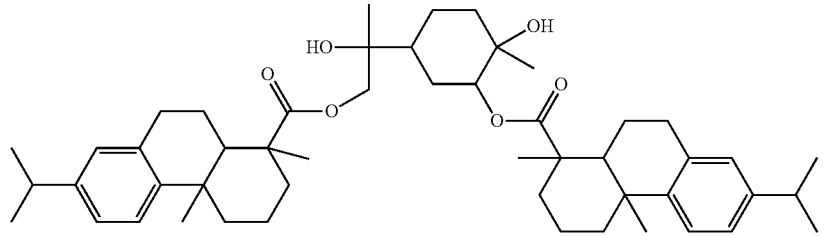
(35)
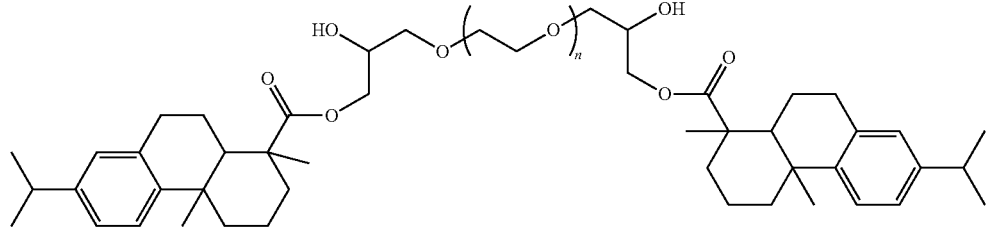
(36)
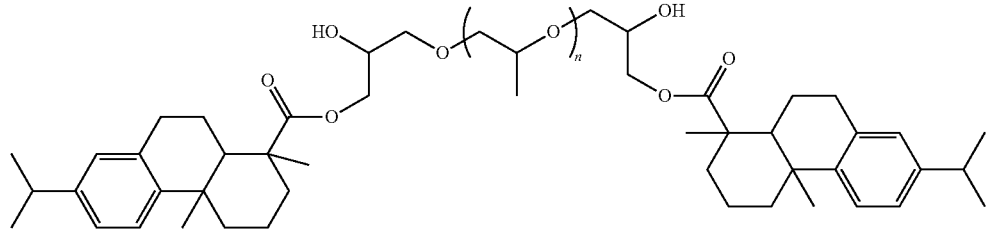
(37)

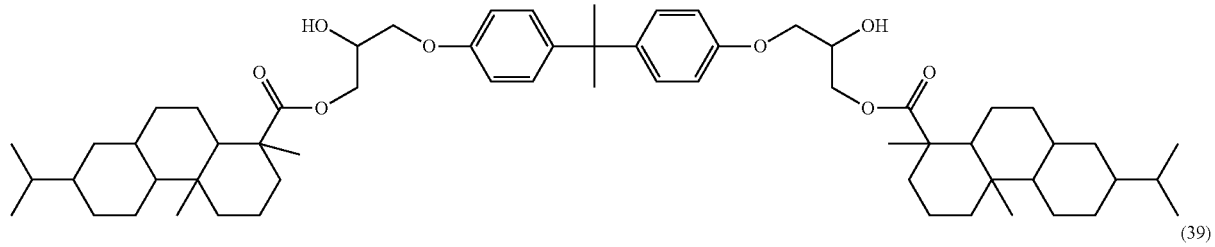

(38)

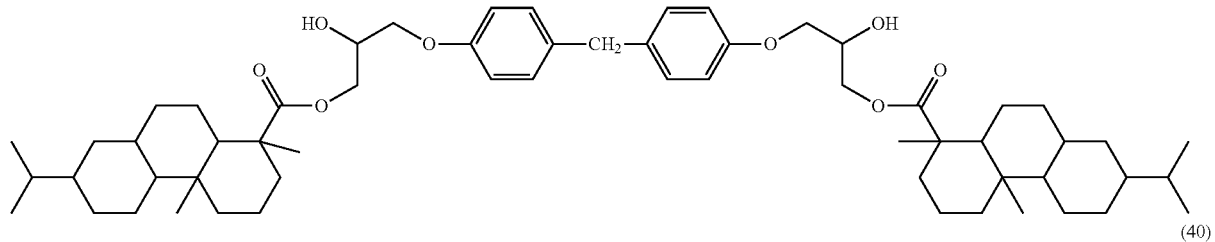

(39)

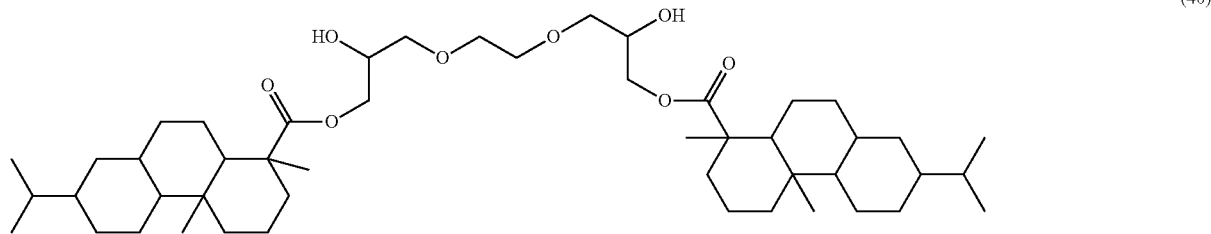

(40)

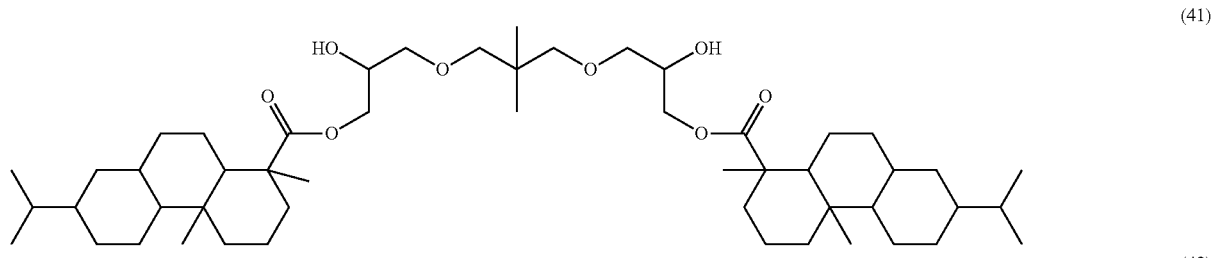

(41)

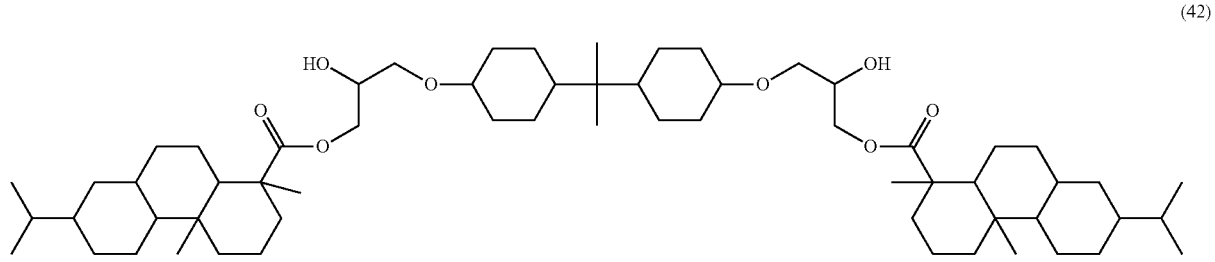

(42)

In the present exemplary embodiment, the dicarboxylic acid component may be selected from the group consisting of aromatic dicarboxylic acids, aliphatic dicarboxylic acids, and mixtures thereof. Examples of such dicarboxylic acid components include: aromatic dicarboxylic acids, such as phthalic acid, isophthalic acid, terephthalic acid, 1,4-naphthalenedicarboxylic acid and 2,6-naphthalenedicarboxylic acid; aliphatic dicarboxylic acids, such as oxalic acid, malonic acid, maleic acid, fumaric acid, citraconic acid, itaconic acid, glutaconic acid, succinic acid, adipic acid, sebacic acid, azelaic acid, dimeric acids, branched $C_1$-$C_{20}$ alkyl succinic acids and branched $C_1$-$C_{20}$ alkenyl succinic acids; anhydrides of these acids; and $C_1$-$C_3$ alkyl esters of these acids. Of these, aromatic carboxylic acid compounds are preferred in terms of durability and fixability of a toner and dispersibility of a coloring agent. Of these, aromatic carboxylic acids such as isophthalic acid and terephthalic acid, and aliphatic carboxylic acids such as succinic acid, sebacic acid and azelaic acid are preferred in terms of durability and fixability of a toner, dispersibility of a coloring agent, and ease of availability.

Such aromatic carboxylic acids and aliphatic carboxylic acids may be used either alone or in combination of two or more thereof. Further, tri- or higher valent aromatic carboxylic acids may be used so long as the effects of the present exemplary embodiment are, not impaired. The tri- or higher valent carboxylic acids may be, for example, trimellitic acid, pyromellitic acid, naphthalenetricarboxylic acid, benzophenone tetracarboxylic acid, biphenyl tetracarboxylic acid or anhydride thereof, and may be used either alone or in combination of two or more thereof. The tri- or higher valent aromatic carboxylic acids are preferably anhydrous trimellitic acid in term of ease of availability and reactivity.

The specific polyester of the present exemplary embodiment may include a diol component other than the specific rosin diol. In the present exemplary embodiment, the content of the specific rosin diol in the specific polyester is preferably from 10 mole % to 100 mole %, more preferably from 20 mole % to 90 mole % from the viewpoint of electrostatic properties.

The dialcoholic component other than the specific rosin diol can be selected from the group consisting of aliphatic diols, etherified diphenols and mixtures thereof so long as the performance of a toner is not deteriorated.

Examples of the aliphatic diols include ethylene glycol, 1,2-propanediol, 1,3-propanediol, 1,2-butanediol, 1,3-butanediol, 1,4-butanediol; 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 3-hydroxy-2,2-dimethylpropyl-3-hydroxy-2,2-dimethylpropanoate, diethylene glycol, triethylene glycol, polyethylene glycol, dipropylene glycol, and polypropylene glycol. These aliphatic diols may be used alone or in combination of two or more thereof.

In the present exemplary embodiment, an etherified diphenol may be further used, together with the aliphatic diol. The etherified diphenol is a diol obtained by addition reaction of bisphenol A and an alkylene oxide. The alkylene oxide is ethylene oxide or propylene oxide. The average number of moles of the alkylene oxide added is from 2 moles to 16 moles per mole of the bisphenol A.

The specific polyester of the present exemplary embodiment may include tri- or higher valent polyols so long as the effects of the present exemplary embodiment are not impaired. The tri- or higher valent polyols may be glycerin, trimethylolethane, trimethylolpropane, pentaerythritol and the like, and may be used either alone or in combination of two or more thereof. The tri- or higher valent polyols are preferably glycerin or trimethylolpropane in terms of ease of availability and reactivity.

The specific polyester of the present exemplary embodiment is prepared from the acid component and the alcoholic component as raw materials by methods publicly known and used in the art. Either transesterification or direct esterification can be applied. The polycondensation may also be accelerated by increasing the reaction temperature under pressure or flowing an inert gas under reduced pressure or ambient pressure. Depending on the reaction conditions, a reaction catalyst may be used to accelerate the reaction. The reaction catalyst may be any of those publicly known and used in the art. The reaction catalyst may be a compound of at least one metal selected from the group consisting of antimony, titanium, tin, zinc, aluminum and manganese. The reaction catalyst is preferably added in an amount of 0.01 parts by mass to 1.5 parts by mass, more preferably 0.05 parts by mass to 1.0 part by mass, based on 100 parts by mass of the acid component and the alcoholic component. The reaction temperature may be from 180° C. to 300° C.

The softening temperature of the specific polyester according to the present exemplary embodiment is preferably from 80° C. to 160° C., more preferably from 90° C. to 150° C. in terms of the fixability, storability and durability of the toner. The glass transition temperature of the specific polyester according to the present exemplary embodiment is preferably from 35° C. to 80° C., more preferably from 40° C. to 70° C. in terms of the fixability, storability and durability of a toner. The softening temperature and glass transition temperature may be easily adjusted by controlling the composition of the raw monomers, the kind of a polymerization initiator, the molecular weight of the specific polyester and the amount of the catalyst or selecting suitable reaction conditions.

Taking into consideration the electrostatic properties of a toner, the acid value of the specific polyester according to the present exemplary embodiment is preferably from 3 mgKOH/g to 30 mgKOH/g. The rosin ester group in the specific polyester of the present exemplary embodiment is a hydrophobic and bulky group. Further, since the air-interface of a toner is generally hydrophobic, the rosin ester group is likely to be exposed on the surface of the toner of the present exemplary embodiment containing the specific polyester of the present exemplary embodiment. If the amount of the rosin ester group exposed on the surface of the toner is too much, the electrostatic properties of the toner may be deteriorated. In the present exemplary embodiment, by setting the acid value of the specific polyester to 3 mgKOH/g to mgKOH/g, the toner is adjusted so as to have a desirable amount of electric charge. If the acid value is higher than 30 mgKOH/g, it is easy to contain water, and especially, the electrostatic properties are deteriorated in summer environments. If the acid value is lower than 3 mgKOH/g, there may be a case that the electrostatic properties are considerably deteriorated. Taking into consideration the improvement of the electrostatic properties of a toner, the acid value of the specific polyester according to the present exemplary embodiment is more preferably from 5 mgKOH/g to 18 mgKOH/g, and most preferably from 9 mgKOH/g to 17 mgKOH/g.

Taking into consideration the improvement of the fixability of a toner, a ratio (Mw/Mn) of weight average molecular weight (Mw) to number average molecular weight (Mn) is preferably from 10 to 13, and more preferably from 10.5 to 12.5.

Taking into consideration the durability, hot offset resistance and fixability of a toner, the weight average molecular weight of the specific polyester according to the present exemplary embodiment is preferably from 10,000 to 200,000, and more preferably from 50,000 to 100,000.

Taking into consideration the durability, hot offset resistance and fixability of a toner, the number average molecular weight of the specific polyester according to the present exemplary embodiment is preferably from 4,000 to 20,000 and more preferably from 5,000 to 10,000.

The specific polyester of the present exemplary embodiment may be modified. Examples of such modified polyesters include polyesters that are grafted or blocked with phenol, urethane or epoxy by the methods described in Japanese Patent Application Laid-Open Nos. Hei 11-133668, Hei 10-239903 and Hei 8-20636.

The specific polyester of the present exemplary embodiment can be used as a binder resin for a toner to produce a toner with excellent fixability. In the toner of the present exemplary embodiment, the specific polyester may be used in combination with another binder resin known in the art, for example, a vinyl resin, such as a styrene-acrylic resin, an epoxy resin, a polycarbonate resin or a polyurethane resin so long as the effects of the present exemplary embodiment are not impaired. In this case, the content of the specific polyester according to the present exemplary embodiment is preferably 70% by mass or more, more preferably 90% by mass, still more preferably substantially 100% by mass.

<Toner>

The toner of the present exemplary embodiment contains the specific polyester of the present exemplary embodiment, and optionally, a polyester other than the specific polyester (hereinafter, referred to as "the second polyester") and at least one component selected from binder resins, coloring agents, release agents, charge control agents and external additives.

The second polyester used in the present exemplary embodiment is an amorphous or crystalline polyester and may be a polycondensate of a known polycarboxylic acid and a known polyhydric alcohol.

The second polyester is preferably a crystalline polyester resin, and particularly, may be a polycondensate of an aliphatic dicarboxylic acid (including acid anhydrides and acid chlorides thereof) and an aliphatic diol in terms of realizing low-temperature fixability.

The aliphatic diol may be ethylene glycol, diethylene glycol, triethylene glycol, 1,2-propylene glycol, 1,3-propylene glycol, 1,4-butanediol, 1,4-butenediol, neopentyl glycol, 1,5-pentane glycol, 1,6-hexanediol, 1,4-cyclolhexanediol, 1,4-cyclohexanedimethanol, dipropylene glycol, polyethylene glycol, polypropylene glycol, polytetramethylene glycol, bisphenol A, bisphenol Z, hydrorogenated biphenol A and the like.

The aliphatic dicarboxylic acid may be oxalic acid, malonic acid, succinic acid, glutaric acid, adipic acid, pimellic acid, suberic acid, azelaic acid, sebacic acid, meleic acid, fumaric acid, citraconic acid, itaconic acid, glutaconic acid, n-dodecylsuccinic acid, n-dodecenylsuccinic acid, isododecylsuccinic acid, isododecenylsuccinic acid, n-octylsuccinic acid, n-octenyisuccinic acid, and acid anhydrides and acid chlorides thereof.

Examples of the second polyester include a polyester which is a polycondensate of 1,4-cyclohexanedimethanol and adipic acid, a polyester which is a polycondensate of 1,6-hexanediol and sebacic acid, a polyester which is a polycondensate of ethylene glycol and succinic acid and a polyester which is a polycondensate of 1,4-butanediol and succinic acid. Of these, a polyester which is a polycondensate of 1,4-cyclohexanedimethanol and adipic acid is preferred.

In addition, examples of the crystalline second polyester include a polyester which is a polycondensate of 1,10-decanediol and sebacic acid and a polyester which is a polycondensate of 1,9-nonanediol and dodecanoic diacid. Of these, a polyester obtained by reacting 1,9-nonanediol and dodecanoic diacid is most preferred.

The weight average molecular weight of the second polyester is preferably from 5,000 to 50,000, and more preferably from 10,000 and 20,000.

When the second polyester is crystalline, the melting temperature is, for example, from 50° C. to 100° C., and preferably from 60° C. to 80° C.

The melting temperature is a value determined as a peak temperature of the endothermic peak obtained by differential scanning calorimetry (DSC). Further, although the crystalline polyester resin may show a plurality of meting peaks, the peak temperature in the present exemplary embodiment is considered as a melting temperature of the maximum peak.

The content of the second polyester is preferably in the range of from 1 part by mass to 20 parts by mass, and more preferably from 5 parts by mass to 15 parts by mass, based on 100 parts by mass of the total binder resin.

The mass ratio (the second polyester/the first polyester) of the content of the second polyester to the content of the first polyester (specific polyester) is preferably from 0.01 to 0.25, and more preferably from 0.05 to 0.18.

The coloring agent used in the present exemplary embodiment may be a dye or a pigment. A pigment is preferred in terms of light fastness and water fastness.

The coloring agent may be a pigment known in the art. Examples of preferred coloring agents include carbon black, aniline black, Aniline Blue, Calcoil Blue, Chrome Yellow, Ultramarine Blue, DuPont Oil Red, Quinoline Yellow, Methylene Blue Chloride, Phthalocyanine Blue, Malachite Green Oxalate, Lamp Black, Rose Bengal, quinacridone, Benzidine Yellow, C.I. Pigment Red 48:1, C.I. Pigment Red 57:1, C.I. Pigment Red 122, C.I. Pigment Red 185, C.I. Pigment Red 238, C.I. Pigment Yellow 12, C.I. Pigment Yellow 17, C.I. Pigment Yellow 180, C.I. Pigment Yellow 97, C.I. Pigment Yellow 74, C.I. Pigment Blue 15:1, and C.I. Pigment Blue 15:3. Depending on the choice of coloring agents, the toner of the present exemplary embodiment may be yellow, magenta, cyan or black in color.

The content of the coloring agent in the toner of the present exemplary embodiment is preferably in the range of from 1 part by mass to 30 parts by mass, based on 100 parts by mass of the binder resin. If needed, it is also effective to use a surface-modified coloring agent or a pigment dispersant.

Examples of release agents for use in the present exemplary embodiment include fatty acid ester waxes; low molecular weight polyolefins such as polyethylene, polypropylene and polybutene; silicones which exhibit softening temperature by heating; fatty acid amides such as oleic acid amide, erucic acid amide, ricinoleic acid amide and stearic acid amide; vegetable waxes such as carnauba wax, rice wax, cadelilla wax, Japan wax and jojoba oil; animal waxes such as beeswax; mineral or petroleum waxes such as montan wax, ozocerite, ceresin, paraffin wax, microcrystalline wax and Fischer-Tropsch wax; and modificates thereof. Of these, fatty acid wax, paraffin wax and carnauba wax are preferred in terms of having excellent fixability of the toner when combined with the specific polyester.

The melting temperatures of these release agents are preferably from 50° C. to 100° C., and more preferably from 60° C. to 95° C.

The content of the release agent in the toner is preferably from 0.5% by mass to 15% by mass, and more preferably from 1.0% by mass to 12% by mass. The presence of the release agent in an amount of 0.5% by mass or more particularly prevents the occurrence of peeling defects in oilless fixing. Meanwhile, the presence of the release agent in an amount of 15% by mass or less improves image quality and reliability for image formation without causing deterioration in the flowability of the toner.

A charge controlling agent may be used in the toner of the present exemplary embodiment. The charge controlling agent may be any of those known in the art, for example, azo-based metal complex compounds, metal complex compounds of salicylic acid and resin type charge controlling agents containing polar groups.

The toner of the present exemplary embodiment may contain a white inorganic powder as the external additive for purpose of achieving improved flowability. Examples of suitable inorganic powders include silica powder, alumina, titanium oxide, barium titanate, magnesium titanate, calcium titanate, strontium titanate, zinc oxide, silica, clay, mica, wollastonite, diatomite, chromium oxide, cerium oxide, bengala, antimony trioxide, magnesium oxide, zirconium oxide, barium sulfate, barium carbonate, calcium carbonate, silicon carbide and silicon nitride. Silica powder is particularly preferred. The mixing proportion of the inorganic powder in the toner is typically in the range of 0.01 parts by mass to 5 parts by mass, preferably 0.01 parts by mass to 2.0 parts by mass, based on 100 parts by mass of the toner. The inorganic powder may be used in combination with another material known in the art, for example, silica, titanium, resin particles (such as polystyrene, PMMA and melamine resin particles) or alumina. The toner of the present exemplary embodiment may further include a cleaning lubricant. The cleaning lubricant may be a metal salt of a higher fatty acid, typified by zinc stearate, or a powder of fluorinated polymer particles.

—Characteristics of Toner—

The shape factor SF1 of the toner according to the present exemplary embodiment is preferably in the range of 110 to 150, more preferably 120 to 140.

The shape factor SF1 is calculated by Equation 1:

$$SF1=(ML^2/A)\times(\pi/4)\times 100 \qquad (1)$$

where ML represents the absolute maximum length of the toner and A represents the projection area of the toner.

The shape factor SF1 is mainly quantified by analyzing a microscope image or scanning electron microscope image using an image analyzer. First, an optical microscope image of particles spread on the surface of a slide glass is inputted to a Luzex image analyzer via a video camera. The maximum lengths and projection areas of 100 of the particles are measured and substituted into Equation 1. The obtained values are averaged.

The volume average particle diameter of the toner particles constituting the toner of the present exemplary embodiment is preferably from 2.0 μm to 10 μm, and more preferably from 3.5 μm to 7.0 μm.

The volume average particle diameter of the toner particles is determined by measuring the particle size distribution of 50,000 particles having a particle diameter of from 2.0 μm to 60 μm using a coulter multisizer type II (manufactured by Beckman-Coulter) with an aperture diameter of 100 μm. A cumulative distribution of the volume is subtracted from the small diameter side with respect to the particle diameter range (channel) divided on the basis of the obtained particle size distribution, and the particle diameter at 50% accumulation is defined as a volume average particle diameter D50 v. 0.5 mg to 50 mg of a sample is added into a surfactant as a dispersing agent, preferably 2 ml of 5% by mass aqueous solution of sodium alkylbenzene sulfonate. The mixture is then added into 100 ml to 150 ml of an aqueous electrolyte solution (an isotonic aqueous solution) and followed by dispersion with an ultrasonic disperser for about 1 minute to prepare a sample for measurement.

—Preparation Method of Toner—

There is no particular restriction on the preparing method of the toner. For example, the toner particles are produced by a dry method, such as kneading-pulverization, or a wet method, such as emulsification aggregation or suspension polymerization. These methods are well known in the art. If necessary, an external additive may be added to the toner particles.

—Kneading-Pulverization Method—

According to a kneading-pulverization method, toner-forming materials including a binder resin are kneaded to obtain a kneaded product, followed by pulverization to produce toner particles.

More specifically, the kneading-pulverization method includes a process for kneading toner-forming materials including a binder resin and a process for pulverizing the kneaded product. If needed, the kneading-pulverization method may further one or more processes, such as a process for cooling the kneaded product after the kneading process.

Details regarding the individual processes will be provided below.

—Kneading Process—

In the kneading process, toner-forming materials including a binder resin are kneaded.

In the kneading process, it is preferred to add an aqueous medium (for example, distilled water, ion exchanged water or an alcohol) in an amount of 0.5 parts by mass to 5 parts by mass, based on 100 parts by mass of the toner-forming materials.

Kneaders, such as single screw extruders and twin screw extruders, may be used in the kneading process. As a non-limiting example, a kneader having a transfer screw section and two kneading sections will be explained with reference to the drawing.

FIG. 1 is a diagram for explaining the state of a screw in an example of a screw extruder used in a preparation method of a toner according to the present exemplary embodiment.

A screw extruder 11 includes a barrel 12 equipped with a screw (not shown), a feed port 14 through which toner-forming materials as raw materials for a toner is fed into the barrel 12, a liquid introducing port 16 through which an aqueous medium is added to the toner-forming materials in the barrel 12, and a discharge port 18 through which a kneaded product of the toner-forming materials in the barrel 12 is discharged.

The barrel 12 is divided into a transfer screw section SA, a kneading section NA, a transfer screw section SB, a kneading section NB and a transfer screw section SC, which are located in this order from a side close to the feed port 14. The transfer screw section SA transports the toner-forming materials fed through the feed port 14 to the kneading section NA. In the kneading section NA, the toner-forming materials are melt-kneaded by a first kneading process. The transfer screw section SB transports the melt-kneaded toner-forming materials from the kneading section NA to the kneading section NB. In the kneading section NB, the toner-forming material is melt-kneaded by a second kneading process to form a kneaded product. The transfer screw section SC transports the kneaded product to the discharge port 18.

Further, the barrel 12 has blocks 12A to 12J provided with different temperature controlling units (not shown). That is, the blocks 12A to 12J may be controlled to different temperatures. FIG. 1 shows the temperatures of the blocks. Specifically, the blocks 12A and 12B are controlled to a temperature of t0° C., the blocks 12C to 12E are controlled to a temperature of t1° C., and the blocks 12F to 12J are controlled to a temperature of t2° C. With this block configuration, the toner-forming materials in the kneading section NA are heated to t1° C. and the toner-forming materials in the kneading section NB are heated to t2° C.

The toner-forming materials including a binder resin are fed into the barrel 12 through the feed port 14 and are sent to the kneading section NA by the transfer screw section SA. The toner-forming materials are heated to the temperature (t1° C.) set in the block 12C and are converted into a molten state. The molten toner-forming materials are sent to and introduced into the kneading section NA. In the kneading section NA, the toner-forming materials are melt-kneaded at the temperature (t1° C.) set in the blocks 12D and 12E. The binder resin is melted in the kneading section NA and is sheared by the screw.

Subsequently, the toner-forming materials having undergone kneading in the kneading section NA are sent to the kneading section NB by the transfer screw section SB.

Subsequently, an aqueous medium is fed into the barrel 12 through the liquid introducing port 16 and is added to the toner-forming materials in the transfer screw section SB. FIG. 1 shows the state in which the aqueous medium is fed in the transfer screw section SB, but the feeding position of the aqueous medium is not limited thereto. For example, the aqueous medium may be fed in the kneading section NB and may be fed in both the transfer screw section SB and the kneading section NB. That is, the feeding position and site of the aqueous medium are selected according to the intended need.

As described above, the aqueous medium is fed into the barrel 12 through the liquid introducing port 16 and is mixed with the toner-forming materials in the barrel 12. The toner-forming materials are cooled down by the latent heat of vaporization of the aqueous medium and are maintained at an appropriate temperature.

Finally, the toner-forming materials are melt-kneaded in the kneading section NB to form a kneaded product and are transported to and discharged from the discharge port 18. In this way, the toner-forming materials are kneaded using the screw extruder 11 illustrated in FIG. 1 is carried out.

—Cooling Process—

In the cooling process, the kneaded product formed by the kneading process is cooled. In the cooling process, it is preferred to lower the temperature of the kneaded product to 40° C. or below at an average rate of at least 4° C./sec. By this rapid temperature drop at the average rate, the dispersed state of the kneaded product immediately after completion of the kneading process is maintained. The average cooling rate refers to an average of the cooling rates from the temperature of the kneaded product (for example, t2° C. in the case using the screw extruder 11 of FIG. 1) after completion of the kneading process to 40° C.

Specifically, the cooling process may be carried out, for example, using a roll where cooling water or brine is circulated and a press-fit type cooling belt. When this method is used for the cooling process, the cooling rate is determined depending on the speed of the roll, the flow amount of the brine, the feed amount of the kneaded product, the thickness of a slab upon rolling of the kneaded product, etc. The thickness of the slab is preferably from 1 mm to 3 mm.

—Pulverization Process—

In the pulverization process, the kneaded product cooled by the cooling process is pulverized to particles. For example, a mechanical pulverizer or jet pulverizer is used in the pulverization process.

—Classification Process—

If needed, the particles obtained by the pulverization process may be classified. By the classification process, toner particles having a volume average particle diameter in a desired range are selected, and particles having a particle diameter smaller than the lower limit of the desired range and particles having a particle diameter larger than the upper limit of the desired range are removed. For example, a traditional classifier, such as a centrifugal classifier or an inertial classifier, may be used in the classification process.

—External Addition Process—

Inorganic powders, typified by specific silica, titania and aluminum oxide powders, as already explained, may be added and attached to the obtained toner particles for the purpose of electrostatic adjustment and imparting flowability and charge exchangeability to the toner particles. This external addition process is carried out, for example, by a V-type blender, a Henschel mixer or a Roedige mixer, and the inorganic powders are attached to the toner particles in divided steps.

—Sieve Classification Process—

If necessary, a sieve classification process may be carried out after the external addition process. Specifically, the sieve classification process may be carried out, for example, using gyro shifter, a vibro classifier or a turbo classifier. By the sieve classification, coarse powders of the external additives are removed to inhibit the formation of stripes on a photoconductor, dirt in the apparatus, etc.

(Aggregation and Coalescence Method)

The aggregation and coalescence method is a method obtaining toner particles by mixing a release agent (wax) and a pigment dispersion into a dispersion obtained by emulsifying a resin, and drying the aggregated particles thus formed.

Particularly, in the aggregation and coalescence method, toner particles are prepared by a step of preparing a specific resin particle dispersion having amorphous specific polyester resin particles (specific polyester particles) dispersed therein (resin particle dispersion preparing step), a step of preparing a second resin particle dispersion having amorphous or crystalline polyester resin particles (the second polyester particles) dispersed therein (resin particle dispersion preparing step), a step of forming aggregated particles by mixing the specific resin particle dispersion and the second resin particle dispersion and then aggregating the specific resin particles and the second polyester resin particles (aggregated particle forming step), and a step of fusing and coalescing the aggregated particles by heating an aggregated particle dispersion having the aggregated particles dispersed therein to form toner particles (fusing and coalescing step).

Further, the toner particles may be prepared by a step of forming second aggregated particles by obtaining an aggregated particle dispersion having aggregated particles dispersed therein, mixing the aggregated particle dispersion with the specific resin particle dispersion and further performing aggregation so as to attach the specific polyester resin particles on the surface of the aggregated particles, and a step of fusing and coalescing the second aggregated particles by heating a second aggregated particle dispersion having the second aggregated particles dispersed therein to form toner particles having a core/shell structure.

Hereinafter, each step will be described in detail.

In addition, a method for obtaining toner particles containing a coloring agent and a release agent will be described below. However, coloring agents and release agents are optionally used. Any additives other than coloring agents and release agents may, of course, be used.

—Resin Particle Dispersion Preparing Step—

First, along with a specific resin particle dispersion having specific particles dispersed therein and a second resin particle dispersion having second polyester resin particles dispersed therein, for example, a coloring agent particle dispersion having coloring agent particles dispersed therein and a release agent dispersion having release agent particles dispersed therein.

Herein, the resin particle dispersions (the specific resin particle dispersion and the second resin particle dispersion) are prepared, for example, by dispersing each of the polyester resin particles (the specific polyester resin particles and the second polyester resin particles) in a dispersion medium by aid of a surfactant.

Examples of the dispersion medium used in the resin particle dispersion include a water-borne medium. Examples of the water-borne medium include water such as distilled water and ion-exchanged water, and alcohols and the like.

Examples of the surfactant include, but not particularly limited to, anionic surfactants such as sulfuric ester salts, sulfonates, phosphoric esters and soap surfactants; cationic surfactants such as amine salts and quaternary ammonium salts; and nonionic surfactants such as polyethylene glycol, alkylphenol ethylene oxide adducts and polyhydric alcohols. Of these, anionic surfactants and cationic surfactants are more preferred. The nonionic surfactants may be used in combination with anionic surfactants or cationic surfactants.

The surfactants may be used either alone or in combination of two or more thereof.

In the resin particle dispersions, the polyester resin particles may be dispersed in the dispersion medium by a general dispersion method, for example, by using a rotary shear type homogenizer, or a ball mill, a sand mill or a Dynomill having media. Further, depending on the kind of resin particles, the resin particles may be dispersed in the resin particle dispersion, for example, by phase inversion emulsification. The phase inversion emulsification is a process in which a resin is dissolved in a hydrophobic organic solvent capable of dissolving the resin, a base is added to the organic continuous phase (O phase) to neutralize the resin, an aqueous medium (W phase) is added to invert the resin into a discontinuous phase from W/O to O/W (so-called phase inversion), so that the resin can be dispersed and stabilized in the form of particles in the aqueous medium.

The volume average particle diameter of the polyester resin particles dispersed in the resin particle dispersion may be, for example, in a range of from 0.01 μm to 11 μm, preferably from 0.08 μm to 0.8 μm, and more preferably 0.1 μm to 0.6 μm.

In addition, the volume average particle diameter of the polyester resin particles is measured by a laser diffraction particle size distribution analyzer (manufactured by Horiba Seisakusho, LA-920). Hereinafter, the volume average particle diameter of particles will be measured in the same manner, unless otherwise specified.

The content of the polyester resin particles contained in the resin particle dispersion may be, for example, from 5% by mass to 50% by mass, and preferably from 10% by mass to 40% by mass.

For example, the coloring agent dispersion and the release agent dispersion may be prepared in a manner similar to the dispersion of resin particles. That is, with respect to the volume average particle diameter of the particles, the dispersion medium, the dispersion method and the content of the particles in the dispersion of the resin particles, the same is applied to the coloring agent particles dispersed in the coloring agent dispersion and the release agent particles dispersed in the release agent dispersion.

—Aggregated Particle Forming Step—

Next, along with the specific resin particle dispersion and the second resin particle dispersion, a coloring agent dispersion and a release agent dispersion are mixed.

In the mixed dispersion, the specific polyester resin particles, the second polyester resin particles, the coloring agent particles and the release agent particles are heteroaggregated to form aggregated particles containing the specific polyester resin particles, the second polyester resin particles, the coloring agent particles and the release agent particles, which have an approximately predetermined particle diameter of the toner.

Particularly, an aggregation agent is added to the mixed dispersion, and the pH of the mixed dispersion is adjusted to an acidic range (for example, from 2 to 5). If necessary, a dispersion stabilizer is added thereto, followed by heating to the glass transition temperature of the specific resin particles (particularly, from the glass transition temperature of the specific polyester resin particles −30° C. to the glass transition temperature −10° C.). The particles dispersed in the mixed dispersion are aggregated to form aggregated particles.

In the aggregated particle forming step, an aggregation agent is added to the mixed dispersion with stirring using a rotary shear type homogenizer at room temperature (for example, 25° C.), and the pH of the mixed dispersion is adjusted to an acidic range (for example, from 2 to 5). If necessary, a dispersion stabilizer may be added thereto, followed by heating.

Examples of the aggregation agent include a surfactant having a polarity opposite to the polarity of the surfactant used as the dispersant, for example, an inorganic metal salt and a di- or higher valent metal complex. In particular, when a metal complex is used as an aggregation agent, the amount of the surfactant used can be reduced, which results in improvement of electrostatic properties.

If necessary, an additive capable of forming a complex or a similar bond with a metal ion may be used. A chelating agent is suitable as the additive.

Examples of the inorganic metal salt include metal salts, such as calcium chloride, calcium nitrate, barium chloride, magnesium chloride, zinc chloride, aluminum chloride and aluminum sulfate; and polymers of inorganic metal salts, such as polyaluminum chloride, polyaluminum hydroxide and calcium polysulfide.

The chelating agent may be a water soluble chelating agent. Examples of the chelating agent include oxycarboxylic acids, such as tartaric acid, citric acid and gluconic acid, iminodiacetic acid (IDA), nitrilotriacetic acid (NTA), and ethylenediaminetetraacetic acid (EDTA).

The amount of the chelating agent added may be in the range of from 0.01 parts by mass to 5.0 parts by mass, or from 0.1 parts by mass to less than 3.0 parts by mass, based on 100 parts by mass of the resin particles.

—Fusing and Coalescing Step—

Next, the aggregated particles are fused and coalesced by heating the aggregated particle dispersion having the aggregated particles dispersed therein to, for example, the glass transition temperature of the specific resin particles (in particular, 10° C. to 30° C. higher than the glass transition temperature of the specific polyester resin particles) or higher, to form toner particles.

The toner particles are obtained by the above-described steps.

After the fusing and coalescing step is completed, the toner particles formed in the solution are subjected to washing, solid-liquid separation and drying processes as known in the art, to obtain dried toner particles.

The washing process is preferably performed by a replacement washing with ion-exchanged water in terms of electrostatic properties. The solid-liquid separation process is not particularly limited but is preferably carried out by filtration under suction or pressure, which is preferred in terms of productivity. The drying process is not particularly limited but is preferably carried out by freeze-drying, flash jet drying, fluidized drying or vibration fluidized drying, in terms of productivity.

The toner according to the present exemplary embodiment is prepared, for example, by adding and mixing external additives to the resulting dried toner particles. The mixing may be carried out by a V-blender, a Henschel mixer, a Lodige mixer and the like. Further, if necessary, coarse particles may be removed using a vibrating screen or a wind screen.

<Developer>

The developer of the present exemplary embodiment includes at least the toner of the present exemplary embodiment.

The toner of the present exemplary embodiment per se may be used as a single component developer. Alternatively, the toner of the present exemplary embodiment may be used as a component of a two-component developer. In this case, the toner of the present exemplary embodiment is used in combination with a carrier.

There is no particular restriction on the kind of the carrier used in the two-component developer. The carrier may be any of those known in the art. The carrier may be, for example, a magnetic metal, such as iron oxide, nickel or cobalt, a magnetic oxide, such as ferrite or magnetite, a resin-coated carrier having a resin coating layer on the surface of the magnetic metal or the magnetic oxide as a core material, or a magnetic dispersion carrier. The carrier may be a resin dispersion carrier in which a conductive material is dispersed in a matrix resin.

The mixing Weight ratio of the toner to the carrier in the two-component developer is preferably in the range of about 1:100 to about 30:100, more preferably about 3:100 to about 20:100.

<Image Forming Apparatus and Image Forming Method>

Subsequently, explanation will be given concerning an image forming apparatus of the present exemplary embodiment using the developer of the present exemplary embodiment.

The image forming apparatus of the present exemplary embodiment includes a latent image holding member, a charging unit configured to electrically charge the surface of the latent image holding member, a forming unit configured to form an electrostatic latent image on the surface of the latent image holding member, a developing unit configured to develop the electrostatic latent image with the developer of the present exemplary embodiment to form a toner image, a transferring unit configured to transfer the toner image to a recording medium, and a fixing unit configured to fix the toner image on the recording medium.

The image forming apparatus of the present exemplary embodiment is used to carry out an image forming method. The image forming method includes a process for electrically charging the surface of a latent image holding member, a process for forming an electrostatic latent image on the surface of the latent image holding member, a process for developing the electrostatic latent image with the developer of the present exemplary embodiment to form a toner image, a process for transferring the toner image to a recording medium, and a process for fixing the toner image on the recording medium.

In the image forming apparatus, a part including the developing unit may be, for example, a cartridge structure (or process cartridge) that is detachably attached to a main body of the image forming apparatus. The process cartridge of the present exemplary embodiment accommodates the developer of the present exemplary embodiment, includes a developing unit configured to develop an electrostatic latent image formed on a latent image holding member with the developer to form a toner image, and is detachably attached to the image forming apparatus.

An example of the image forming apparatus according to the present exemplary embodiment will explained below, but the present exemplary embodiment is not limited thereto. Further, the main units of the image forming apparatus illustrated in the drawing will be explained, and explanation of the other units is omitted.

Figure 2:
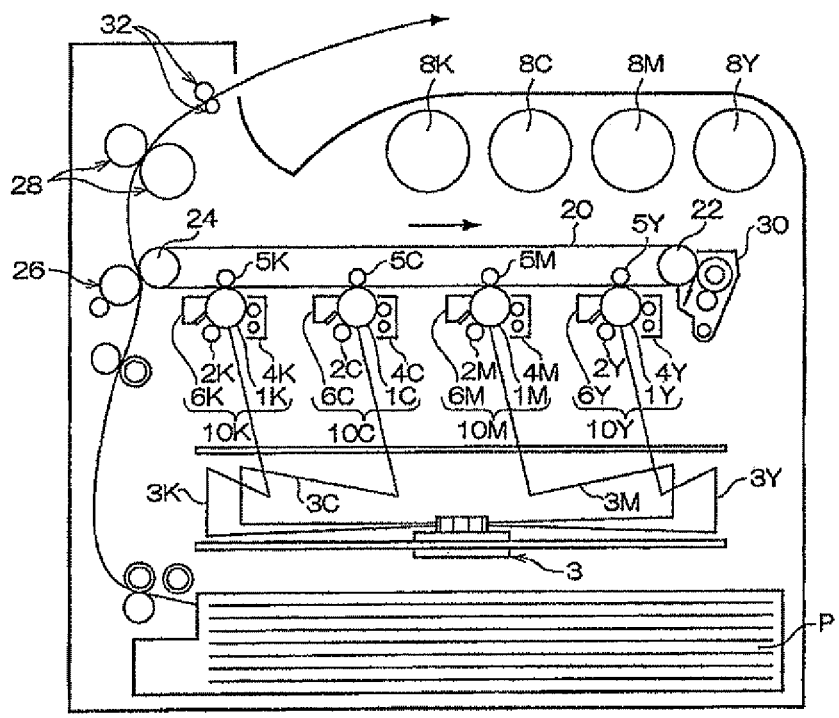
FIG. 2 is a schematic view illustrating the constitution of an example of an image forming apparatus according to the present exemplary embodiment.

FIG. 2 is a schematic view illustrating a quadruple tandem type color image forming apparatus. The image forming apparatus illustrated in FIG. 2 includes first, second, third and fourth image forming units 10Y, 10M, 10C and 10K of electrophotographic mode outputting yellow (Y), magenta (M), cyan (C) and black (K) color images based on color-separated image data. The image forming units (hereinafter, also referred to simply as "units") 10Y, 10M, 10C and 10K are arranged in parallel at predetermined intervals in a horizontal direction. The units 10Y, 10M, 10C and 10K may be process cartridges that can be detachably attached to a main body of the image forming apparatus.

As illustrated in FIG. 2, an intermediate transfer belt 20 as an intermediate transfer member is installed to run on top of the units 10Y, 10M, 10C and 10K. The intermediate transfer belt 20 is installed to wind a drive roller 22 and a support roller 24 in contact with the inner side thereof. The intermediate transfer belt 20 runs in a direction from the first unit 10Y toward the fourth unit 10K. The support roller 24 is pressed in a direction away from the drive roller 22 by a spring (now shown). A predetermined tension is given on the intermediate transfer belt 20 winding the two rollers. At a lateral surface of a latent image holding member of the intermediate transfer belt 20, an apparatus 30 for cleaning the intermediate transfer material is provided opposite the drive roller 22.

Developing apparatuses (or developing units) 4Y, 4M, 4C and 4K of the units 10Y, 10M, 10C and 10K can supply toners of four colors, i.e. yellow, magenta, cyan and black colors, accommodated in the toner cartridges 8Y, 8M, 8C and 8K, respectively.

Since the four units 10Y, 10M, 10C and 10K have the same constitution, the explanation of the first unit 10Y, which is arranged upstream the running direction of the intermediate transfer belt, can be applied to the other units. The units 10M, 10C and 10K include parts corresponding to the parts of the first unit 10Y and designated by letters M (magenta), C (cyan) and K (black) instead of Y (yellow), respectively, and their description is omitted.

The first unit 10Y has a photoconductor 1Y acting as a latent image holding member. A roller 2Y for electrically charging the surface of the photoconductor 1Y with a predetermined potential, an apparatus 3 for exposing the electrically charged surface to a laser beam 3Y based on color-separated image signals to form an electrostatic latent image, an apparatus (or a unit) 4Y for feeding an electrically charged toner to the electrostatic latent image to develop the electrostatic latent image, a primary transfer roller (or a primary transfer unit) 5Y for transferring the developed toner image to the intermediate transfer belt 20, and a cleaning apparatus (or a cleaning unit) 6Y for removing the toner remaining on the surface of the photoconductor 1Y after the primary transfer are arranged around the photoconductor 1Y.

The primary transfer roller 5Y is arranged at the inner side of the intermediate transfer belt 20 and is installed in a position opposite the photoconductor 1Y. A bias power supply (not shown) is connected and apply a primary transfer bias to each of the primary transfer rollers 5Y, 5M, 5C and 5K. The transfer bias applied to each of the primary transfer rollers from the bias power supply is varied by a control unit (not shown).

Hereinafter, an explanation will be given concerning the formation operation of a yellow image in the first unit 10Y. Prior to the operation, the surface of the photoconductor 1Y is electrically charged to about −600 V to about −800 V by the roller 2Y.

The photoconductor 1Y is formed by laminating a photosensitive layer on a conductive base having a volume resistivity of $1 \times 10^{-6}$ Ωcm or less at 20° C. Although the resistance of the photosensitive layer is usually high (comparable to that of general resins), the resistivity of a portion of the photosensitive layer irradiated with the laser beam 3Y tends to vary. Depending on yellow image data sent from a control unit (not shown), the exposure apparatus 3 outputs the laser beam 3Y to the surface of the electrically charged photoconductor 1Y. The laser beam 3Y is irradiated onto the surface of the photoconductor 1Y to form an electrostatic latent image in a yellow factor pattern on the surface of the photoconductor 1Y.

The electrostatic latent image refers to an image formed on the surface of the photoconductor 1Y by electrostatic charging. The electrostatic latent image is formed in the form of a so-called negative latent image because electrical charges flow on the surface of irradiated portions of the photoconductor 1Y due to the decreased resistivity of the irradiated portions but electrical charges remain on portions non-irradiated with the laser beam 3Y.

The electrostatic latent image formed on the photoconductor 1Y is rotated up to a predetermined development position according to the running motion of the photoconductor 1Y. At the development position, the electrostatic latent image on the photoconductor 1Y is visualized (developed) by the developing apparatus 4Y.

The yellow developer accommodated in the developing apparatus 4Y is friction-charged while agitating inside the developing apparatus 4Y, possesses the same polarity (negative polarity) as the counter charges charged on the photoconductor 1Y, and is maintained on a developer roll (or a developer holding member). When the surface of the photoconductor 1Y passes through the developing apparatus 4Y, the yellow toner is electrostatically attached to the antistatic latent image portions on the surface of the photoconductor 1Y. As a result, the latent image is developed with the yellow toner. The photoconductor 1Y, on which the yellow toner image is formed, runs continuously at a predetermined speed to allow the toner image developed on the photoconductor 1Y to be conveyed to a predetermined primary transfer position.

When the yellow toner image on the photoconductor 1Y is conveyed to the primary transfer position, a predetermined primary transfer bias is applied to the primary transfer roller 5Y to allow an electrostatic force directing toward the primary transfer roller 5Y from the photoconductor 1Y to act on the toner image. As a result, the toner image on the photoconductor 1Y is transferred to the intermediate transfer belt 20. The applied transfer bias has a polarity (+) opposite to the polarity (−) of the toner. In the first unit 10Y, for example, the applied transfer bias is controlled to about +10 µA by a control unit (not shown).

The toner remaining on the photoconductor 1Y is removed by the cleaning apparatus 6Y and is then collected.

The primary transfer biases applied to the primary transfer rollers 5M, 5C, 5K are controlled in substantially the same manner as in the first unit.

The intermediate transfer belt 20, to which the yellow toner image is transferred, is sequentially conveyed from the first unit 10Y to the second, third and fourth units 10M, 10C and 10K. As a result of this sequential conveying, toner images of different colors overlap to form one overlapping toner image.

The intermediate transfer belt 20, where the four toner images overlap while passing through the first, second, third and fourth units, reaches a secondary transfer unit including the intermediate transfer belt 20, the support roller 24 in contact with the inner side of the intermediate transfer belt 20 and a secondary transfer roller (or a secondary transfer unit) 26 arranged on an image holding surface of the intermediate transfer belt 20. A recording paper (or a transfer-receiving material) is fed at a predetermined timing into a gap between the secondary transfer roller 26 and the intermediate transfer belt 20, which are in contact with each other under pressure, through a feed mechanism and a predetermined secondary transfer bias is applied to the support roller 24. The applied transfer bias has the same polarity (−) as the polarity (−) of the toner and an electrostatic force directing toward the recording medium P from the intermediate transfer belt 20 acts on the overlapping toner image to allow the overlapping toner image on the intermediate transfer belt 20 to be transferred to the recording paper P. The secondary transfer bias is determined depending on the resistance of the secondary transferring unit, which is detected by a detecting unit (not shown), and the voltage thereof is controlled.

Thereafter, the recording paper P is sent to a fixing apparatus (or a fixing unit) 28. In the fixing apparatus, the overlapping toner image is heat-melted and fixed on the recording paper P. After the fixing of the color image is finished, the recording paper P is conveyed to the discharging unit by a convey roll (or a discharge roll) 32, completing the series of color image forming operations.

The image forming apparatus is constructed such that the overlapping toner image is transferred to the recording paper P through the intermediate transfer belt 20, but is not limited to this construction. For example, the image forming apparatus may have a construction that allows for direct transfer of the toner image from the photoconductor to the recording paper.

<Process Cartridge and Toner Cartridge>

Figure 3:
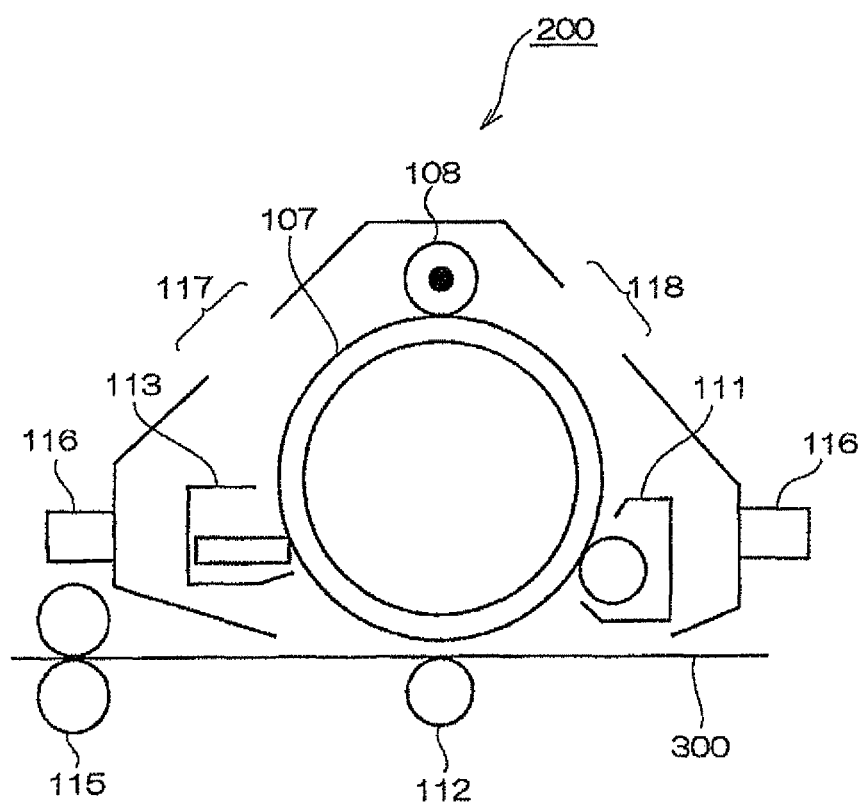
FIG. 3 is a schematic view illustrating the constitution of an example of a process cartridge according to the present exemplary embodiment.

FIG. 3 is a schematic view illustrating the constitution of a suitable example of a process cartridge accommodating the developer of the present exemplary embodiment. As illustrated in FIG. 3, the process cartridge 200 is a combination of a photoconductor 107, an electrically charging roller 108, a developing apparatus 111, a photoconductor cleaning apparatus (or a cleaning unit) 113, an opening for exposure 118 and an opening for antistatic exposure 117 on a rail 116, which are integrated into one cartridge.

The process cartridge 200 is freely attached detachably to a transfer apparatus 112, a fixing apparatus 115 and a main body of an image forming apparatus including other elements (not shown). The process cartridge 200 is combined with the main body to construct an image forming apparatus. Reference numeral 300 indicates a recording paper.

The photoconductor 107, the electrically charging roller 108, the developing apparatus 111, the cleaning unit 113, the opening for exposure 118 and the opening for antistatic exposure 117 included in the process cartridge 200 illustrated in FIG. 3 may be selectively combined. For example, the process cartridge of the present exemplary embodiment may include the developing apparatus 111 and at least one element selected from the group consisting of the photoconductor 107, the electrically charging roller 108, the developing apparatus 111, the cleaning apparatus (cleaning unit) 113, the opening for exposure 118 and the opening for antistatic exposure 117.

Next, an explanation will be given concerning a toner cartridge.

The toner cartridge is attached detachably to the image forming apparatus and at least accommodates a toner that is fed into the developing unit installed in the image forming apparatus. The toner is the toner of the present exemplary embodiment explained already. The construction of the toner cartridge is not limited so long as the toner is accommodated in the toner cartridge. A developer may be accommodated in the toner cartridge depending on the mechanism of the image forming apparatus.

The image forming apparatus illustrated in FIG. 2 is constructed such that the toner cartridges 8Y, 8M, 8C and 8K are attached detachably. The developing apparatuses 4Y, 4M, 4C and 4K are connected to corresponding toner cartridges through developer feed paths (not shown) depending on the colors thereof. The toner cartridges can be exchanged with new ones when the developers accommodated in the toner cartridges are substantially used up.

EXAMPLES

The present exemplary embodiments will be explained in detail with reference to the following examples but are not limited thereto. In the examples, unless otherwise indicated, all parts and percentages are by mass.

Method for Measurement of Physical Properties of Polyester Resin

<Measurement of Softening Temperature>

A sample (1 cm³) is melt and is allowed to flow out using a Koka type flow tester (CFT-500, manufactured by Shimadzu Corporation) under the following conditions: dice pore diameter=0.5 mm, pressure load=0.98 MPa (10 Kg/cm²), heating rate=1° C./min. A temperature corresponding to a half of the height between the starting temperature and the end temperature of the outflow is defined as the softening temperature.

<Measurement of Glass Transition Temperature>

The glass transition temperature is measured using a thermal analyzer (DSC-20, manufactured by SEICO Electronics industrial Co., Ltd.) while heating 10 mg of a sample at a constant rate of 10° C./min.

<Measurement of Weight Average Molecular Weight (Mw) and Number Average Molecular Weight (Mn)>

The weight average molecular weight (Mw) and number average molecular weight (Mn) are measured using apparatuses (HLC-8120GPC and SC-8020, manufactured by TOSOH Corporation) and columns (TSKgel Super HM-H, 6.0 mm ID×15 cm×2, manufactured by TOSOH Corporation) using tetrahydrofuran (THF) as an eluting solvent and an RI detector under the following conditions: sample concentration=0.5%, flow rate=0.6 ml/min, sample feeding rate=10 μl, temperature=40° C. Standard calibration curves are plotted using 10 polystyrene standard (TSK standard) samples A-500, F-1, F-10, F-80, F-380, A-2500, F-4, F-40, F-128 and F-700, (manufactured by TOSOH Corporation).

<Measurement of Acid Value>

The acid value is measured by neutralization titration in accordance with JIS K0070. Specifically, 100 ml of a mixed solvent of diethyl ether and ethanol and drops of phenolphthalein as an indicator are added to an appropriate amount of a sample and the resulting mixture is sufficiently stirred in a water bath until the sample is completely dissolved. The solution is titrated with a 0.1 mol/l ethanolic solution of potassium hydroxide. The time when pale red of the indicator is observed for 30 sec is defined as the endpoint. The acid value is calculated by A=(B×f×5.611)/S where A is the acid value, B is the volume (ml) of the 0.1 mol/l ethanolic solution of potassium hydroxide, f is the factor of the 0.1 mol/l ethanolic solution of potassium hydroxide, and S is the sample amount (g).

[Calculation of SP Value]

The SP value is calculated in accordance with Fedor's method as described above.

—Synthesis of Specific Rosin diol 1—

113 parts of bisphenol A diglycidyl ether (trande name of jER828, manufactured by Mitsubishi Chemical Corporation) as a difunctional epoxy compound, 200 parts of rosin, and 0.4 parts of triphenylphosphine (manufactured by Tokyo Chemical Industry Co., Ltd.) as a reaction catalyst are heated in a stainless steel reaction vessel equipped with a stirrer, a heater, a condenser and a thermometer at 130° C. for 4 hr. As a result of the reaction, the epoxy groups of the epoxy compound are ring-opened by the carboxyl group of the rosin. When the acid value reaches 0.5 mgKOH/g, the reaction is stopped, yielding specific rosin diol 1 as the compound exemplified above.

As the rosins, gum rosin as a purified rosin which is purified by distillation at 6.6 kPa and 220° C. (trade name of Pine Crystal KR614, manufactured by Arakawa Chemical Industries, Ltd.), a disproportionated rosin (manufactured by Wuzhou Co., Ltd.) and a hydrogenated rosin (trade name of Foral AX, manufactured by Pinova Inc.) are used respectively to obtain three kinds of specific rosin diols.

The specific rosin diol obtained from the purified rosin is Exemplary compound (1), the specific rosin diol obtained from the disproportionated rosin is Exemplary compound (18), and the specific rosin diol obtained from the hydrogenated rosin is Exemplary compound (38).

Example 1

Synthesis of Specific Polyester 270 parts of specific rosin diol, which is synthesized using a hydrogenated rosin, as an alcoholic component, 30 parts of 1,6-hexanediol (manufactured by Wako Pure Chemical Industries, Ltd.), 50 parts of isophthalic acid (manufactured by Wako Pure Chemical Industries, Ltd.) as an acid component, 53 parts of 3-dodecenyl succinic anhydride (manufactured by New Japan Chemical Co., Ltd.) and 0.3 parts of tetra-n-butyl titanate (manufactured by Tokyo Chemical Industry Co., Ltd.) as a reaction catalyst are heated with stirring in a stainless steel reaction vessel equipped with a stirrer, a heater, a thermometer, a classifier and a nitrogen gas introducing tube under a nitrogen atmosphere at 230° C. for 7 hr. As a result of the reaction, specific rosin diol 1 is polycondensed with the isophthalic acid. When the molecular weight and acid value of the reaction product reach predetermined values, the reaction is stopped, yielding specific polyester 1.

2 g of specific polyester 1 is heated in 10 ml of deuterated dimethyl sulfoxide and 2 ml of a 7 N deuterated methanolic solution of sodium hydroxide at 150° C. for 3 hr. After completion of the hydrolysis, deuterated water is added. The resin has the set values of specific rosin diol, 1,6-hexanediol, isophthalic acid and 3-dodecenyl succinic anhydride, as confirmed by $^1$H-NMR spectroscopy.

The results of the measured SP value, molecular weights, acid values, glass transition temperatures and softening temperatures of specific polyester 1 are shown in Table 1.

Examples 2 to 16

Synthesis of Specific Polyester

Specific polyesters 2 to 16 are synthesized in the same manner as in Example 1 using an acid component and an alcoholic component shown in Table 1.

The results of the measured SP value, molecular weights, acid values, glass transition temperatures and softening temperatures of specific polyesters 2 to 16 are shown in Table 1.

Comparative Examples 1 to 3

Synthesis of Comparative Specific Polyester

Comparative polyesters C1 to C3 are synthesized in the same manner as in Example 1 using the acid component and the alcoholic component shown in Table 1.

The results of the measured SP value, molecular weights, acid values, glass transition temperatures and softening temperatures of the comparative polyesters C1 to C3 are shown in Table 1.

In table 1, "BPA-PO" represents an adduct of 2 moles of propylene oxide to bisphenol A, and "BPA-EO" represents an adduct of 2 moles of ethylene oxide to bisphenol A.

TABLE 1

| | | Comparative example 1 | Example 1 | Example 2 | Example 3 | Example 4 | Example 5 | Example 6 | Example 7 | Example 8 | Example 9 |
|---|---|---|---|---|---|---|---|---|---|---|---|
| Specific polyester or comparative polyester | | (C 1) | (1) | (2) | (3) | (4) | (5) | (6) | (7) | (8) | (9) |
| Dicarboxylic acid components | Terephthalic acid | 33 parts | — | — | — | — | 33 parts | — | — | 46 parts | 40 parts |
| | Isophthalic acid | — | 50 parts | — | — | 51 parts | — | 38 parts | 46 parts | — | — |
| | Succinic acid | — | — | 24 parts | 12 parts | — | — | — | — | — | — |
| | Sebacic acid | 46 parts | — | — | 20 parts | 24 parts | 40 parts | 40 parts | 30 parts | 44 parts | 42 parts |
| | 3-dodecenyl succinic anhydride | 19 parts | 53 parts | 80 parts | 53 parts | 19 parts | 27 parts | 19 parts | 19 parts | — | 19 parts |
| Tri- or higher valent aromatic carboxylic acid | Anhydrous trimellitic acid | 10 parts | — | 10 parts | 10 parts | 10 parts | — | 10 parts | 10 parts | 10 parts | 10 parts |
| Alcoholic components | Specific rosin diol | 323 parts | 270 parts | 270 parts | 270 parts | 270 parts | 270 parts | 270 parts | 183 parts | 215 parts | 270 parts |
| | BPA-PO | 69 parts | — | 87 parts | 52 parts | 87 parts | 87 parts | 87 parts | 114 parts | 104 parts | 87 parts |
| | BPA-EO | — | — | — | — | — | — | — | — | — | — |
| | 1,6-hexanediol | — | 30 parts | — | — | — | — | — | — | — | — |
| Kind of rosin used in synthesis of specific rosin diol | | Hydrogenated rosin | Hydrogenated rosin | Disproportionated rosin | Hydrogenated rosin | Hydrogenated rosin | Disproportionated rosin | Purified rosin | Disproportionated rosin | Purified rosin | Disproportionated rosin |
| Content of specific rosin diol (%) | | 64.6 | 67.0 | 57.3 | 64.7 | 58.6 | 59.1 | 58.2 | 45.5 | 51.3 | 57.7 |
| SP value | | 9.05 | 9.13 | 9.18 | 9.20 | 9.25 | 9.27 | 9.30 | 9.32 | 9.32 | 9.33 |
| Mw (10,000) | | 7.25 | 6.55 | 5.88 | 6.84 | 6.87 | 7.42 | 7.60 | 6.50 | 6.83 | 7.08 |
| Mn (10,000) | | 0.63 | 0.61 | 0.62 | 0.61 | 0.58 | 0.70 | 0.58 | 0.67 | 0.67 | 0.62 |
| Mw/Mn | | 11.5 | 10.7 | 9.5 | 11.2 | 11.8 | 10.6 | 13.1 | 9.7 | 10.2 | 11.4 |
| Acid value (mgKOH/g) | | 14.1 | 14.6 | 17.1 | 13.7 | 10.8 | 16.5 | 12.2 | 10.7 | 15.4 | 8.1 |
| Glass transition temperature (° C.) | | 47.5 | 50.0 | 50.4 | 52.8 | 55.6 | 54.4 | 55.1 | 54.6 | 52.5 | 56.3 |
| Softening temperature (° C.) | | 117.3 | 110.1 | 112.7 | 116.3 | 121.6 | 120.9 | 121.9 | 123.1 | 125.4 | 119.9 |

| | | Example 10 | Example 11 | Example 12 | Example 13 | Example 14 | Example 15 | Example 16 | Comparative Example 2 | Comparative Example 3 |
|---|---|---|---|---|---|---|---|---|---|---|
| Specific polyester or comparative polyester | | (10) | (11) | (12) | (13) | (14) | (15) | (16) | (C2) | (C3) |
| Dicarboxylic acid components | Terephthalic acid | — | — | — | — | — | — | — | — | — |
| | Isophthalic acid | 38 parts | 23 parts | — | 30 parts | 55 parts | 25 parts | — | — | — |
| | Succinic acid | — | 34 parts | 59 parts | — | — | 35 parts | 59 parts | 47 parts | 35 parts |
| | Sebacic acid | 40 parts | — | — | 44 parts | 20 parts | — | — | — | — |
| | 3-dodecenyl succinic anhydride | 19 parts | 19 parts | — | — | 19 parts | 13 parts | — | 27 parts | 53 parts |
| Tri- or higher valent aromatic carboxylic acid | Anhydrous trimellitic acid | 10 parts | 10 parts | 10 parts | — | 10 parts | 10 parts | 10 parts | — | 10 parts |
| Alcoholic components | Specific rosin diol | 270 parts | 183 parts | 226 parts | 215 parts | 108 parts | 108 parts | 108 parts | 54 parts | — |
| | BPA-PO | 87 parts | 114 parts | 100 parts | — | 138 parts | 138 parts | 138 parts | 156 parts | 69 parts |
| | BPA-EO | — | — | — | 95 parts | — | — | — | — | — |
| | 1,6-hexanediol | — | — | — | — | — | — | — | — | 36 parts |
| Kind of rosin used in synthesis of specific rosin diol | | Disproportionated rosin | Disproportionated rosin | Disproportionated rosin | Purified rosin | Disproportionated rosin | Purified rosin | Purified rosin | Purified rosin | Purified rosin |
| Content of specific rosin diol (%) | | 58.2 | 47.8 | 57.2 | 56.0 | 30.9 | 32.8 | 34.3 | 19.0 | 0 |
| SP value | | 9.35 | 9.39 | 9.40 | 9.40 | 9.42 | 9.53 | 9.65 | 9.82 | 10.10 |
| Mw (10,000) | | 5.37 | 6.05 | 7.31 | 9.28 | 6.11 | 7.17 | 7.21 | 6.33 | 5.98 |
| Mn (10,000) | | 0.61 | 0.60 | 0.59 | 0.87 | 0.62 | 0.69 | 0.64 | 0.59 | 0.59 |
| Mw/Mn | | 8.8 | 10.1 | 12.4 | 10.7 | 9.9 | 10.4 | 11.3 | 10.7 | 10.1 |
| Acid value (mgKOH/g) | | 11.6 | 12.9 | 15.4 | 14.1 | 11.1 | 12.5 | 15.0 | 15.2 | 16.8 |
| Glass transition temperature (° C.) | | 57.0 | 57.5 | 56.2 | 54.0 | 54.1 | 57.9 | 57.5 | 48.2 | 50.3 |
| Softening temperature (° C.) | | 122.9 | 118.6 | 118.2 | 133.8 | 121.2 | 119.5 | 120.1 | 119.1 | 119.7 |

<Preparation of Resin Particle Dispersion of Specific Polyester>

3,000 parts of specific polyester 1, 10,000 parts of ion-exchanged water and 90 parts of sodium dodecylbenzene sulfonate as a surfactant are heat-melted at 130° C. in a emulsifying tank of a high-temperature/high-pressure emulsifier (Cavitron CD 1010, slit size of 0.4 mm), followed by dispersion at 110° C. for 30 minutes at a flow rate of 3 L/min, and 10,000 rpm. An amorphous resin particle dispersion (high-temperature/high-pressure emulsifier (Cavitron CD 1010, slit size of 0.4 mm)) is recovered via a cooling tank to obtain amorphous resin particle dispersion a1.

<Synthesis Example of Second Polyester, Preparation of Resin Particle Dispersion Thereof>

160 parts of 1,9-nonanediol, 138 parts of 1,10-dodecane diacid and 0.05 parts of dibutyltin oxide are put into a three-necked flask which is heat-dried. The mixture is stirred by mechanical stirrer at 180° C. for 2 hr while maintaining an inert atmosphere by reducing the pressure with a nitrogen gas in the flask. Thereafter, the reaction mixture is slowly heated to 230° C. under reduced pressure and stirred for 5 hr. When the reaction mixture becomes viscous, the mixture is air-cooled, and the reaction is stopped, yielding a crystalline polyester resin B1. The melting temperature Tm of the resin is 74° C.

Subsequently, crystalline polyester resin particle dispersion b1 is prepared under the same condition as in the preparation of amorphous polyester resin particle dispersion a1 using a high-temperature/high-pressure emulsifier (Cavitron CD 1010, slit size of 0.4 mm).

<Preparation of Coloring Agent Particle Dispersion>

The following materials are mixed, dissolved, and dispersed using a high-pressure impact type disperser Ultimizer (trade name of HJP30006, manufactured by Sugino Machine, Ltd.) for about 1 hr to prepare a coloring agent dispersion in which a coloring agent (cyan pigment) is dispersed. The coloring agent in the coloring agent dispersion has an average particle diameter of 0.13 µm and the concentration of coloring agent particles is 25%.

<Preparation of release agent particle dispersion>

| | |
|---|---|
| Cyan pigment (Pigment Blue 15:3 (copper phthalocyanine), manufactured by Dainichiseika Color & Chemicals Mfg. Co., Ltd.): | 100 parts |
| Anionic surfactant (Neogen RK, manufactured by Dai-ichi Kogyo Seiyaku Co., Ltd.): | 15 parts |
| Ion-exchanged water: | 900 parts |

[Preparation of Release Agent Particle Dispersion c1]

The following materials are heated at 110° C., and dispersed using a homogenizer (ULTRA-TURRAX T50, manufactured by IKA Co., Ltd.) and is further dispersed using a Manton-Gaulin high-pressure homogenizer (manufactured by Gaulin Corporation) to prepare a release agent particle dispersion (concentration of the release agent: 26%) in which the release agent particles having an average particle diameter of 0.21 µm are dispersed.

| | |
|---|---|
| Fatty acid ester (WEP-5, manufactured by NOF Corporation): | 50 parts |
| Anionic surfactant (Neogen RK, manufactured by Dai-ichi Kogyo Seiyaku Co., Ltd.): | 5 parts |
| Ion-exchanged water: | 200 parts |

[Preparation of Release Agent Particle Dispersion c2]

The following materials are heated at 95° C., and dispersed using a homogenizer (ULTRA-TURRAX T50, manufactured by IKA Co., Ltd.) and is further dispersed using a Manton-Gaulin high-pressure homogenizer (manufactured by Gaulin Corporation) to prepare a release agent particle dispersion (concentration of the release agent: 21.5%) in which the release agent particles having an average particle diameter of 0.18 µm are dispersed.

| | |
|---|---|
| Paraffin wax (HNP-9, manufactured by Nippon Seiro Co., Ltd.): | 50 parts |
| Anionic surfactant (Neogen RK, manufactured by Dai-ichi Kogyo Seiyaku Co., Ltd.): | 5 parts |
| Ion-exchanged water: | 200 parts |

[Preparation of Release Agent Particle Dispersion c3]

The following materials are heated at 100° C., and dispersed using a homogenizer (ULTRA-TURRAX T50, manufactured by IKA Co., Ltd.) and is further dispersed using a Manton-Gaulin high-pressure homogenizer (manufactured by Gaulin Corporation) to prepare a release agent particle dispersion (concentration of the release agent: 20%) in which the release agent particles having an average particle diameter of 0.2 µm are dispersed.

| | |
|---|---|
| Carnauba wax (RC-160, manufactured by TOA Kasei Co., Ltd.): | 50 parts |
| Anionic surfactant (Neogen RK, manufactured by Dai-ichi Kogyo Seiyaku Co., Ltd.): | 5 parts |
| Ion-exchanged water: | 200 parts |

Example 101

Preparation of Toner Particles

The following materials are put in a cylindrical stainless steel flask and dispersed using a homogenizer (ULTRA-TURRAX T50, manufactured by IKA Co., Ltd.), and are heated to 42° C. in a heating oil bath and maintained for 30 minutes. When the formation of the aggregated particles is observed, 100 parts of amorphous polyester resin particle dispersion a1 is further added and maintained for another 30 minutes.

| | |
|---|---|
| Amorphous polyester resin particle dispersion a1: | 90 parts |
| Crystalline polyester resin particle dispersion b1: | 10 parts |
| Coloring agent particle dispersion: | 50 parts |
| Release agent particle dispersion c1: | 60 parts |
| Aqueous surfactant solution: | 10 parts |
| 0.3M aqueous nitric acid solution: | 50 parts |
| Ion-exchanged water: | 500 parts |

Subsequently, nitrilotriacetic acid, Na salt (trade name of Chelest 70, manufactured by Chubu Chelest Co. Ltd.) is added to be 3% of the entire solution. Thereafter, 1 N aqueous solution of sodium hydroxide is slowly added to reach a pH level of 7.2, and is heated to 85° C. with stirring and maintained for 3 hr. Then, the reaction product is filtered and washed with ion-exchanged water, and dried using a vacuum drier to obtain toner particles 1. The toner particles 1 are found to have a volume average particle diameter D 50 of 3.9 µm, as measured using Coulter Multisizer, and a particle size distribution coefficient (GSD) is 1.22.

(Preparation of Toner)

100 parts of toner particles 1, 3 parts of silica particles (obtained by a sol-gel method, having a 5% of surface treatment amount by hexamethyldisilazane and first average particle diameter of 120 nm) and 1 part of silica particles (trade name of R972, manufactured by Nippon Aerosil Co., Ltd.) are mixed using a 5 L Henschel Mixer at a peripheral velocity (tip velocity) of 30 m/s for 15 minutes. Coarse particles are sieved using a 45 μm mesh to produce toner particles 1.

(Preparation of Developer)

7 parts of toner 1 is added to 100 parts of a carrier including ferrite particles which have a particle diameter of 50 μm and are coated with methyl methacrylate styrene copolymer. Toner 1 and the carrier are mixed using a tumbler shaker mixer to produce developer 1. Further, toner 1 and the carrier are mixed under the condition of summer environments (30° C., relative humidity of 85%) and winter environments (5° C., relative humidity of 10%).

Evaluation (Evaluation of Fixability)

The developer is loaded onto a modified machine of Docu-Centre Color 500 manufactured by Fuji Xerox Co., Ltd. Images are formed at 28° C. and 85% RH on 10,000 sheets of colored paper (J paper) manufactured by Fuji Xerox Co., Ltd. as a print test chart with an image density of 1%. The surface of the images is observed with the naked eye, and the occurrence of roll marks of a paper transfer roll is evaluated based on the following criteria. The results are shown in Table 2.

A: No roll mark lines are observed.
B: Roll mark lines are not observed until the 9,000th paper, but slightly observed on the 10,000th paper.
C: Roll mark lines are slightly observed from the 5,000th paper.
D: Roll mark lines are clearly observed from the 5,000th paper.

(Evaluation of Electrostatic Properties)

The electric charge amount (μC/g) of each of the toners of developers mixed in summer and winter environments respectively is measured using a blow-off tester manufactured by Toshiba Corporation, to obtain the ratio of the two. The ratio approximating 1 implies a desirable result. The results are shown in Table 2.

Further, since the toner is negatively charged, the electric charge amount (μC/g) in Table 2 represents an absolute value.

Examples 102 to 116

Preparation of Toner Particles, Toners and Developers

Toner particles 2 to 16, toners 2 to 16, and developers 2 to 16 are obtained in the same manner as in Example 101, except that specific polyester 1 is changed to any one of specific polyesters 2 to 16.

Each of the examples is evaluated for fixability and electrostatic properties in the same manner as in Example 101. The results are shown in Table 2.

Comparative Examples 101 to 103

Preparation of Toner Particles, Toners and Developers

Toner particles C1 to C3, toners C1 to C3, and developers C1 to C3 are obtained in the same manner as in Example 101, except that specific polyester 1 is changed to any one of comparative polyesters C1 to C3.

Each of the comparative examples is evaluated for fixability and electrostatic properties in the same manner as in Example 101. The results are shown in Table 2.

TABLE 2

| | | Comparative example 101 | Example 101 | Example 102 | Example 103 | Example 104 | Example 105 | Example 106 | Example 107 | Example 108 | Example 109 |
|---|---|---|---|---|---|---|---|---|---|---|---|
| Specific polyester or comparative polyester | | (C 1) | (1) | (2) | (3) | (4) | (5) | (6) | (7) | (8) | (9) |
| Toner | | (C 1) | (1) | (2) | (3) | (4) | (5) | (6) | (7) | (8) | (9) |
| Fixability | | D | B | C | A | A | B | C | C | B | B |
| Electrostatic properties | (1) Amount of electric charge in summer environmental conditions | 69.9 | 67.3 | 68.7 | 54.8 | 66.6 | 63.8 | 59.3 | 60.8 | 62.9 | 37.7 |
| | (2) Amount of electric charge in winter environmental conditions | 103.1 | 99.2 | 100.2 | 91.7 | 96.2 | 99.4 | 87.7 | 89.3 | 101.2 | 85.0 |
| | (1)/(2) | 0.68 | 0.68 | 0.69 | 0.60 | 0.69 | 0.64 | 0.68 | 0.68 | 0.62 | 0.44 |

| | | Example 110 | Example 111 | Example 112 | Example 113 | Example 114 | Example 115 | Example 116 | Comparative Example 102 | Comparative Example 103 |
|---|---|---|---|---|---|---|---|---|---|---|
| Specific polyester or comparative polyester | | (10) | (11) | (12) | (13) | (14) | (15) | (16) | (C2) | (C3) |
| Toner | | (10) | (11) | (12) | (13) | (14) | (15) | (16) | (C2) | (C3) |
| Fixability | | C | B | A | A | C | B | B | D | D |
| Electrostatic properties | (1) Amount of electric charge in summer environmental conditions | 63.1 | 61.8 | 59.7 | 57.3 | 55.4 | 46.6 | 38.5 | 33.2 | 25.5 |

TABLE 2-continued

|  | | | | | | | | | |
|---|---|---|---|---|---|---|---|---|---|
| (2) Amount of electric charge in winter environmental conditions | 100.2 | 94.1 | 85.2 | 92.5 | 88.3 | 87.1 | 74.2 | 106.5 | 88.3 |
| (1)/(2) | 0.63 | 0.66 | 0.70 | 0.62 | 0.63 | 0.54 | 0.52 | 0.31 | 0.29 |

As can be seen from Table 2, Examples show excellent fixability and electrostatic properties, compared with Comparative Examples.

Comparative Example 1 where the SP value is less than 9.1 shows poor fixability. Comparative Example 2 where the SP value is more than 9.7 shows poor fixability and electrostatic properties. In Comparative Example 3 where the SP value is more than 9.7 and a specific rosin diol component is not included in a polyester, fixability is not good due to a lowered image intensity, and electrostatic properties are not good, either.

Examples 201 and 202

Preparation of Toner Particles, Toners and Developers

Toner particles 17 and 18, toners 17 and 18, and developers 17 and 18 are obtained in the same manner as in Example 101, except that specific polyester 1 is changed to specific polyester 12, and release agent particle dispersion c1 is changed to release agent particle dispersion c2 or c3.

Each of the examples is evaluated for fixability and electrostatic properties in the same manner as in Example 101. The results are shown in Table 3.

TABLE 3

|  | Example 201 | Example 202 |
|---|---|---|
| Specific polyester | (12) | (12) |
| Release agent particle dispersion | (c2) | (c3) |
| Toner | (17) | (18) |
| Fixability | A | A |
| Electrostatic properties | | |
| (1) Amount of electric charge in summer environmental conditions (μC/g) | 60.3 | 59.9 |
| (2) Amount of electric charge in winter environmental conditions (μC/g) | 88.4 | 87.2 |
| (1)/(2) | 0.68 | 0.69 |

As can be seen from Table 3, Examples 201 and 202 show the same level of excellence in fixability and electrostatic properties as that of Example 112 using the same specific polyester.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A toner, comprising:
   a polyester resin comprising:
      a repeating unit derived from a dicarboxylic acid component; and
      a repeating unit derived from a diol component represented by Formula 1:

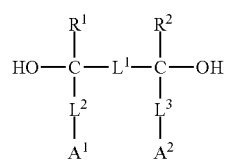

Formula 1 where in Formula 1,
   each of $R^1$ and $R^2$ independently represents a hydrogen atom or a methyl group,
   each of $L^1$, $L^2$ and $L^3$ independently represents a divalent linking group selected from the group consisting of carbonyl groups, ester groups, ether groups, sulfonyl groups, substituted or unsubstituted chained alkylene groups, substituted or unsubstituted cyclic alkylene groups, substituted or unsubstituted arylene groups, and combinations thereof,
   $L^1$ and $L^2$ or $L^1$ and $L^3$ optionally forms a ring, and
   each of $A^1$ and $A^2$ independently represents a rosin ester group, and
   wherein the solubility parameter (SP) value of the polyester resin is from 9.1 to 9.7; and
a release agent.

2. The toner according to claim 1, wherein a ratio (Mw/Mn) of a weight average molecular weight (Mw) and a number average molecular weight (Mn) of the polyester resin is from 10 to 13.

3. A developer comprising the toner according to claim 1.

4. A toner cartridge containing the toner according to claim 1 and that is detachably attached to an image forming apparatus.

5. A process cartridge containing the developer according to claim 3, comprising:
   a unit for developing an electrostatic latent image formed on a latent image holding member with the developer to form a toner image,
      wherein the process cartridge is detachably attached to an image forming apparatus.

6. An image forming apparatus, comprising:
   a latent image holding member;
   a charging unit configured to electrically charge the surface of the latent image holding member;
   a forming unit configured to form an electrostatic latent image on the surface of the latent image holding member;
   a developing unit containing the developer according to claim 3 and configured to develop the electrostatic latent image formed on the surface of the latent image holding member with the developer to form a toner image;

a transferring unit configured to transfer the toner image to a recording medium; and a fixing unit configured to fix the toner image on the recording medium.

7. An image forming method comprising:

electrically charging a surface of a latent image holding member;

forming an electrostatic latent image on the surface of the latent image holding member;

developing the electrostatic latent image formed on the surface of the latent image holding member with the developer according to claim 3 to form a toner image;

transferring the toner image to a recording medium; and fixing the toner image on the recording medium.

* * * * *